(12) United States Patent
Lu et al.

(10) Patent No.: US 7,251,411 B1
(45) Date of Patent: Jul. 31, 2007

(54) FIBER OPTIC CABLE BREAKOUT CONFIGURATION WITH "Y" BLOCK

(75) Inventors: Yu Lu, Westborough, MA (US); Keith Millea, Sutton, MA (US); Jeff Gniadek, Northridge, MA (US)

(73) Assignee: ADC Telecommunication, Inc., Eden Prairie, MN (US)

( * ) Notice: Subject to any disclaimer, the term of this patent is extended or adjusted under 35 U.S.C. 154(b) by 0 days.

(21) Appl. No.: 11/491,008

(22) Filed: Jul. 21, 2006

Related U.S. Application Data

(60) Provisional application No. 60/781,280, filed on Mar. 9, 2006.

(51) Int. Cl.
G02B 6/255 (2006.01)
G02B 6/44 (2006.01)
G02B 6/46 (2006.01)
G02B 6/00 (2006.01)

(52) U.S. Cl. .................. 385/147; 385/95; 385/103; 385/106; 385/136

(58) Field of Classification Search .............. None
See application file for complete search history.

(56) References Cited

U.S. PATENT DOCUMENTS

| | | | |
|---|---|---|---|
| 2,047,152 A | 7/1936 | Mitchell | |
| 3,691,505 A | 9/1972 | Graves | |
| 3,845,552 A | 11/1974 | Waltz | |
| 3,879,575 A | 4/1975 | Dobbin et al. | |
| 3,912,854 A | 10/1975 | Thompson et al. | |
| 3,912,855 A | 10/1975 | Thompson et al. | |
| 4,085,286 A | 4/1978 | Horsma et al. | |
| 4,107,451 A | 8/1978 | Smith, Jr. et al. | |
| 4,152,539 A | 5/1979 | Charlebois et al. | |
| 4,322,573 A | 3/1982 | Charlebois | |
| 4,343,844 A | 8/1982 | Thayer et al. | |
| 4,405,083 A | 9/1983 | Charlebois et al. | |
| 4,413,881 A | 11/1983 | Kovats | |
| 4,467,137 A | 8/1984 | Jonathan et al. | |
| 4,475,935 A | 10/1984 | Tanaka et al. | |
| 4,481,380 A | 11/1984 | Wood et al. | |

(Continued)

FOREIGN PATENT DOCUMENTS

DE 35 37 684 A1 4/1987

(Continued)

OTHER PUBLICATIONS

"Cable Assemblies: Molding & Termination," http://www.dgo.com/prodcable.htm, 8 pages (Copyright 2001), no date.

(Continued)

Primary Examiner—Rodney Bovernick
Assistant Examiner—Omar Rojas
(74) Attorney, Agent, or Firm—Merchant & Gould P.C.

(57) ABSTRACT

The present disclosure relates to a telecommunications cable including a distribution cable and a tether that branches from the distribution cable at a mid-span breakout location. A flexible closure covers the mid-span breakout location. Within the closure, fibers are broken out from the distribution cable and spliced to fibers of the tether. The lengths of broken out fibers within the flexible closure are provided with sufficient excess fiber length to allow the closure to be readily bent/flexed in any direction without damaging the fibers.

22 Claims, 33 Drawing Sheets

U.S. PATENT DOCUMENTS

| | | |
|---|---|---|
| 4,490,315 A | 12/1984 | Charlebois et al. |
| 4,512,628 A | 4/1985 | Anderton |
| 4,528,150 A | 7/1985 | Charlebois et al. |
| 4,528,419 A | 7/1985 | Charlebois et al. |
| 4,549,039 A | 10/1985 | Charlebois et al. |
| 4,550,220 A | 10/1985 | Kitchens |
| 4,556,281 A | 12/1985 | Anderton |
| 4,570,032 A | 2/1986 | Charlebois et al. |
| 4,581,480 A | 4/1986 | Charlebois |
| 4,589,939 A | 5/1986 | Mohebban et al. |
| 4,591,330 A | 5/1986 | Charlebois et al. |
| 4,592,721 A | 6/1986 | Charlebois et al. |
| 4,595,256 A | 6/1986 | Guazzo |
| 4,609,773 A | 9/1986 | Brown et al. |
| 4,625,073 A | 11/1986 | Breesch et al. |
| 4,629,597 A | 12/1986 | Charlebois et al. |
| 4,648,606 A | 3/1987 | Brown et al. |
| 4,648,919 A | 3/1987 | Diaz et al. |
| 4,654,474 A | 3/1987 | Charlebois et al. |
| 4,666,537 A | 5/1987 | Dienes |
| 4,670,069 A | 6/1987 | Debbaut et al. |
| 4,670,980 A | 6/1987 | Charlebois et al. |
| 4,678,866 A | 7/1987 | Charlebois |
| 4,684,764 A | 8/1987 | Luzzi et al. |
| 4,701,574 A | 10/1987 | Shimirak et al. |
| 4,725,035 A | 2/1988 | Charlebois et al. |
| 4,732,628 A | 3/1988 | Dienes |
| 4,747,020 A | 5/1988 | Brickley et al. |
| 4,761,052 A | 8/1988 | Buekers et al. |
| 4,764,232 A | 8/1988 | Hunter |
| 4,818,824 A | 4/1989 | Dixit et al. |
| 4,822,434 A | 4/1989 | Sawaki et al. |
| 4,875,952 A | 10/1989 | Mullin et al. |
| 4,884,863 A | 12/1989 | Throckmorton |
| 4,913,512 A | 4/1990 | Anderton |
| 4,961,623 A | 10/1990 | Midkiff et al. |
| 4,963,698 A | 10/1990 | Chang et al. |
| 5,004,315 A | 4/1991 | Miyazaki |
| 5,042,901 A | 8/1991 | Merriken et al. |
| 5,046,811 A | 9/1991 | Jung et al. |
| 5,054,868 A | 10/1991 | Hoban et al. |
| 5,066,095 A | 11/1991 | Dekeyser et al. |
| 5,074,808 A | 12/1991 | Beamenderfer et al. |
| 5,097,529 A | 3/1992 | Cobb et al. |
| 5,099,088 A | 3/1992 | Usami et al. |
| 5,115,105 A | 5/1992 | Gallusser et al. |
| 5,121,458 A | 6/1992 | Nilsson et al. |
| 5,125,060 A | 6/1992 | Edmundson |
| 5,185,844 A | 2/1993 | Bensel, III et al. |
| 5,194,692 A | 3/1993 | Gallusser et al. |
| 5,210,812 A | 5/1993 | Nilsson et al. |
| 5,217,808 A | 6/1993 | Cobb |
| 5,241,611 A | 8/1993 | Gould |
| 5,245,151 A | 9/1993 | Chamberlain et al. |
| 5,335,408 A | 8/1994 | Cobb |
| 5,347,089 A | 9/1994 | Barrat et al. |
| 5,353,367 A | 10/1994 | Czosnowski et al. |
| 5,376,196 A | 12/1994 | Grajewski et al. |
| 5,378,853 A | 1/1995 | Clouet et al. |
| 5,394,502 A | 2/1995 | Caron |
| 5,402,515 A | 3/1995 | Vidacovich et al. |
| 5,410,105 A | 4/1995 | Tahara et al. |
| RE34,955 E | 5/1995 | Anton et al. |
| 5,420,958 A | 5/1995 | Henson et al. |
| 5,440,665 A * | 8/1995 | Ray et al. .................. 385/135 |
| 5,442,726 A | 8/1995 | Howard et al. |
| 5,450,517 A | 9/1995 | Essert |
| 5,491,766 A | 2/1996 | Huynh et al. |
| 5,509,202 A | 4/1996 | Abdow |
| 5,517,592 A | 5/1996 | Grajewski et al. |
| 5,528,718 A | 6/1996 | Ray et al. |
| 5,657,413 A | 8/1997 | Ray et al. |
| 5,666,453 A | 9/1997 | Dannenmann |
| 5,684,911 A | 11/1997 | Burgett |
| 5,696,864 A | 12/1997 | Smith et al. |
| 5,734,776 A | 3/1998 | Puetz |
| 5,767,448 A | 6/1998 | Dong |
| 5,778,122 A | 7/1998 | Giebel et al. |
| 5,823,646 A | 10/1998 | Arizpe et al. |
| 5,825,963 A | 10/1998 | Burgett |
| 5,892,870 A | 4/1999 | Fingler et al. |
| 5,945,633 A | 8/1999 | Ott et al. |
| 5,969,294 A | 10/1999 | Eberle et al. |
| 5,997,186 A | 12/1999 | Huynh et al. |
| RE36,592 E | 2/2000 | Giebel et al. |
| 6,104,846 A | 8/2000 | Hodgson et al. |
| RE37,028 E | 1/2001 | Cooke et al. |
| 6,181,861 B1 | 1/2001 | Wenski et al. |
| 6,215,930 B1 | 4/2001 | Estes et al. |
| 6,255,584 B1 | 7/2001 | Renaud |
| 6,376,774 B1 | 4/2002 | Oh et al. |
| 6,407,338 B1 | 6/2002 | Smith |
| 6,466,725 B2 | 10/2002 | Battey et al. |
| 6,493,500 B1 | 12/2002 | Oh et al. |
| 6,539,160 B2 | 3/2003 | Battey et al. |
| 6,579,014 B2 | 6/2003 | Melton et al. |
| 6,619,697 B2 | 9/2003 | Griffioen et al. |
| 6,621,975 B2 | 9/2003 | Laporte et al. |
| 6,648,520 B2 | 11/2003 | McDonald et al. |
| 6,655,016 B2 | 12/2003 | Renaud |
| 6,668,127 B1 | 12/2003 | Mahony |
| 6,706,968 B2 | 3/2004 | Yaworski et al. |
| 6,764,220 B2 | 7/2004 | Griffiths et al. |
| 6,810,194 B2 | 10/2004 | Griffiths et al. |
| 6,819,842 B1 | 11/2004 | Vogel et al. |
| 6,856,748 B1 | 2/2005 | Elkins, II et al. |
| 6,880,219 B2 | 4/2005 | Griffioen et al. |
| 7,006,739 B2 | 2/2006 | Elkins, II et al. |
| 7,016,592 B2 | 3/2006 | Elkins, II et al. |
| 2004/0074852 A1 | 4/2004 | Knudsen et al. |
| 2004/0228589 A1 | 11/2004 | Melton et al. |
| 2004/0247265 A1 | 12/2004 | Takano et al. |
| 2005/0053342 A1 | 3/2005 | Melton et al. |
| 2005/0069275 A1 | 3/2005 | Brants et al. |
| 2005/0111799 A1 | 5/2005 | Cooke et al. |
| 2005/0111800 A1 | 5/2005 | Cooke et al. |
| 2005/0175308 A1 | 8/2005 | Elkins, II et al. |
| 2005/0259928 A1 | 11/2005 | Elkins, II et al. |
| 2005/0259929 A1 | 11/2005 | Elkins, II et al. |
| 2005/0259930 A1 | 11/2005 | Elkins, II et al. |
| 2005/0276552 A1 | 12/2005 | Cooke et al. |
| 2006/0056782 A1 | 3/2006 | Elkins, II et al. |
| 2006/0193573 A1* | 8/2006 | Greenwood et al. ........ 385/103 |

FOREIGN PATENT DOCUMENTS

| | | |
|---|---|---|
| EP | 0 115 725 A1 | 8/1984 |
| EP | 1 361 465 A1 | 11/2003 |
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-54204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 2001-116968 | 4/2001 |
| WO | WO 2005/119322 A1 | 12/2005 |

| | | | |
|---|---|---|---|
| WO | WO 2006/044080 A1 | 4/2006 | |

OTHER PUBLICATIONS

"DAM/BLOK™ Electrical Splice Kit," http://www.pmiind.com/products/damblok.html, 3 pages (Copyright 2000), no date.

"Factory Installed Termination Systems for Fiber Optic Cable Splices," 1 page (admitted as prior art as of the filing date), no date.

"Installation Instructions for Pre-Connectorized MIC® Cable (2-6 Fiber) Equipped with Plug & Play™ Sysyems Pulling Grips," *Corning Cable Systems*, Issue 7, pp. 1-3 (Jul. 2001).

"Pre-Connectorized (4-24 Fiber) Fiber Optic Cables Equipped with Plug & Play™ Systems Pulling Sleeves and Grips," *Corning Cable Systems*, Issue 1, pp. 1-7 (Mar. 2005).

\* cited by examiner

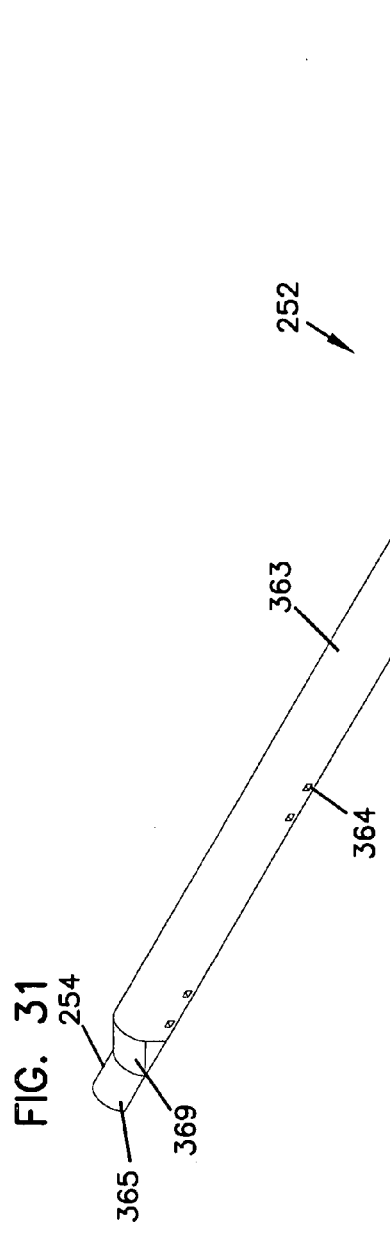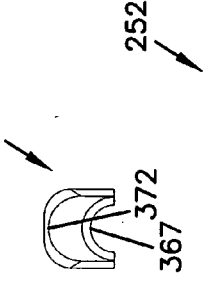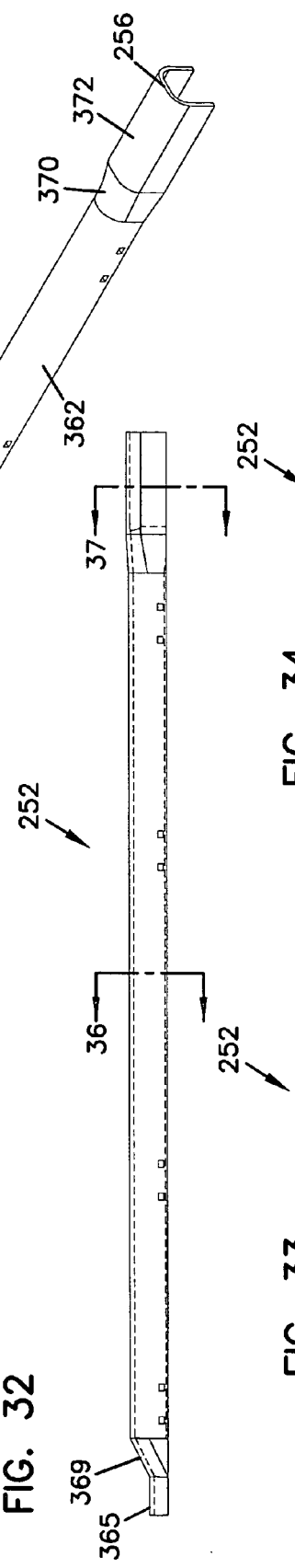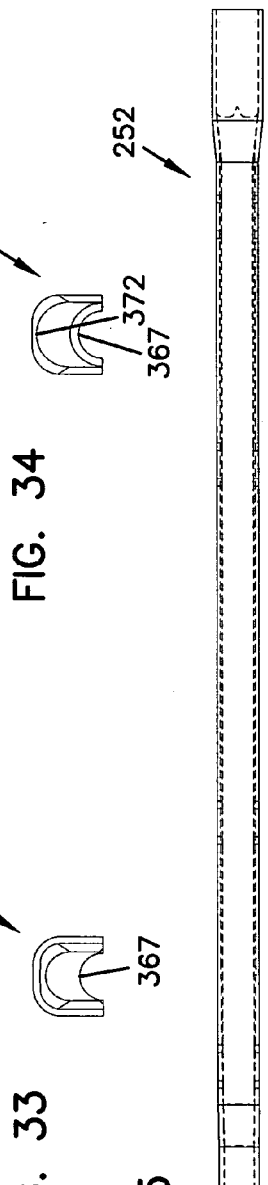

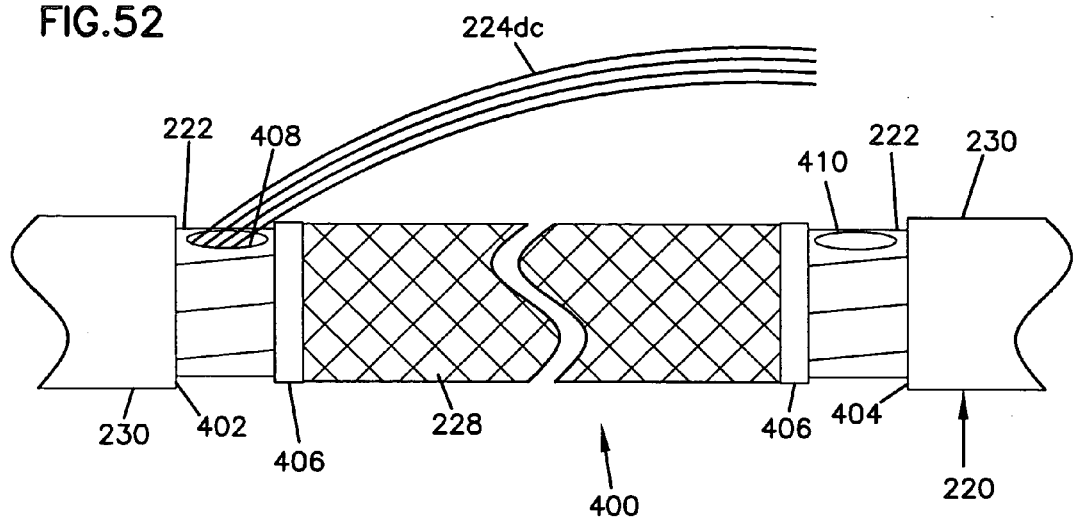
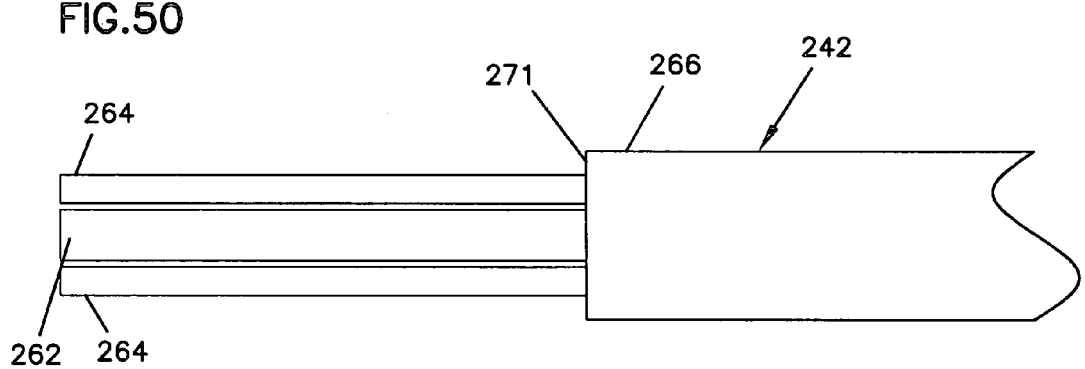
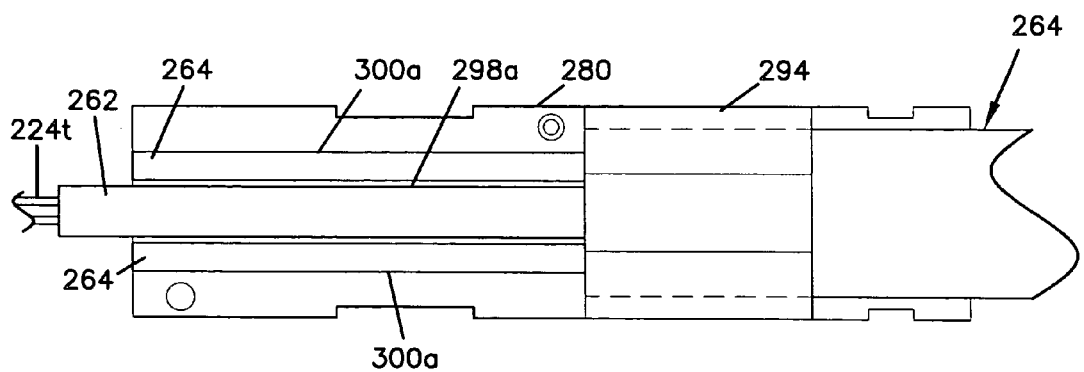

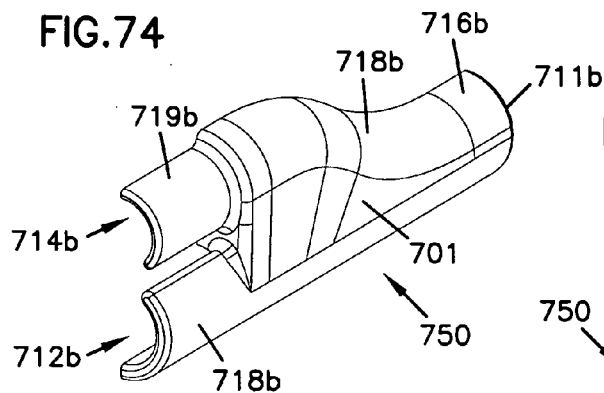
FIG. 74
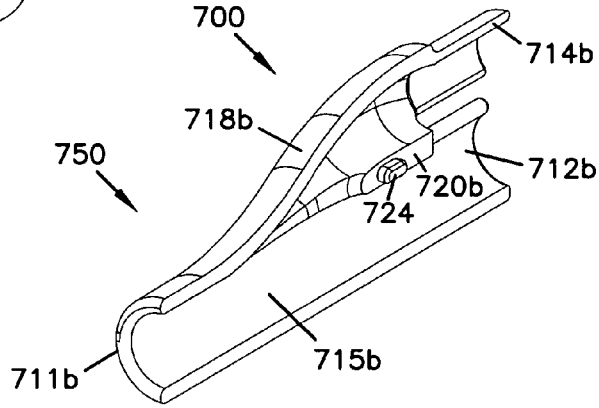
FIG. 75
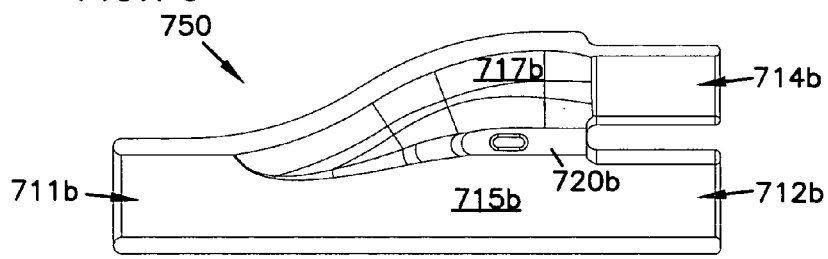
FIG. 76
FIG. 77
FIG. 78
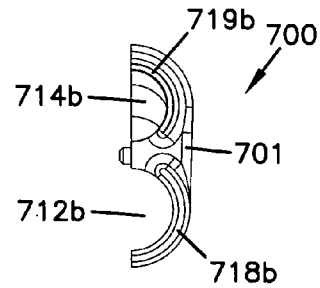
FIG. 79
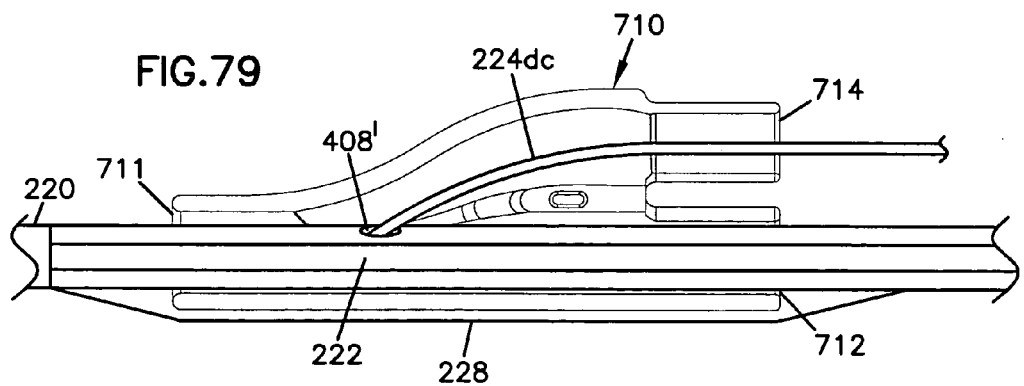

FIBER OPTIC CABLE BREAKOUT CONFIGURATION WITH "Y" BLOCK

RELATED APPLICATION

This application claims benefit of provisional application Ser. No. 60/781,280, entitled FIBER OPTIC CABLE BREAKOUT CONFIGURATION, filed Mar. 9, 2006, the disclosure of which is incorporated by reference.

TECHNICAL FIELD

The principles disclosed herein relate to fiber optic cable systems. More particularly, the present disclosure relates to fiber optic cable systems having main cables and branch cables.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown in FIG. 1, the network 100 may include a central office 110 that connects a number of end subscribers 115 (also called end users 115 herein) in a network. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits (e.g., see conduit 105).

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations may include fewer or more fibers. The portion of network 100 that includes an FDH 130 and a number of end users 115 may be referred to as an F2 portion of network 100. Splitters used in an FDH 130 may accept a feeder cable having a number of fibers and may split those incoming fibers into, for example, 216 to 432 individual distribution fibers that may be associated with a like number of end user locations.

Referring to FIG. 1, the network 100 includes a plurality of breakout locations 125 at which branch cables (e.g., drop cables, stub cables, etc.) are separated out from main cables (e.g., distribution cables). Breakout locations can also be referred to as tap locations or branch locations and branch cables can also be referred to as breakout cables. At a breakout location, fibers of the branch cables are typically spliced to selected fibers of the main cable. However, for certain applications, the interface between the fibers of the main cable and the fibers of the branch cables can be connectorized.

Stub cables are typically branch cables that are routed from breakout locations to intermediate access locations such as a pedestals, drop terminals or hubs. Intermediate access locations can provide connector interfaces located between breakout locations and subscriber locations. A drop cable is a cable that typically forms the last leg to a subscriber location. For example, drop cables are routed from intermediate access locations to subscriber locations. Drop cables can also be routed directly from breakout locations to subscriber locations hereby bypassing any intermediate access locations Branch cables can manually be separated out from a main cable in the field using field splices. Field splices are typically housed within sealed splice enclosures. Manual splicing in the field is time consuming and expensive.

As an alternative to manual splicing in the field, pre-terminated cable systems have been developed. Pre-terminated cable systems include factory integrated breakout locations manufactured at predetermined positions along the length of a main cable (e.g., see U.S. Pat. Nos. 4,961,623; 5,125,060; and 5,210,812). However, the installation of pre-terminated cables can be difficult. For example, for underground applications, pre-terminations can complicate passing pre-terminated cable through the underground conduit typically used to hold fiber optic cable (e.g., 1.25 inch inner diameter conduit). Similarly, for aerial applications, pre-terminations can complicate passing pre-terminated cable through aerial cable retention loops.

SUMMARY

Certain aspects of the disclosure relate to mid-span breakout configurations for pre-terminated fiber optic distribution cables.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 31 is a perspective view of a protective sleeve used at the mid-span breakout location of FIG. 3;
FIG. 32 is a front side view of the protective sleeve of FIG. 31;
FIG. 33 is a right end view of the protective sleeve of FIG. 31;
FIG. 34 is a left end view of the protective sleeve of FIG. 31;
FIG. 35 is a top view of the protective sleeve of FIG. 31;
FIG. 50 shows a first preparation step for a tether used at the mid-span breakout location of FIG. 3;
FIG. 51 shows a subsequent preparation step of the tether of FIG. 50;
and
FIG. 52 shows an initial preparation of the distribution cable at the mid-span breakout location;
FIG. 74 is a rear perspective view of an example second section of the separation block of FIG. 68;
FIG. 75 is a front perspective view of the second section of FIG. 74;
FIG. 76 is a side view of the second section of FIG. 74;
FIG. 77 is a top view of the second section of FIG. 74;
FIG. 78 is a cross-sectional view of the first section of FIG. 74;
and
FIG. 79 is a side view of the second section of FIG. 74 showing preparation of a distribution cable at an example mid-span breakout location.

DETAILED DESCRIPTION

The present disclosure relates to mid-span breakout arrangements provided on distribution cables. A typical distribution cable includes a relatively large number of fibers (e.g., 72, 144 or more fibers). The fibers are typically segregated into separate groups with each group contained within a separate buffer tube. The fibers within each buffer tube can include either ribbon fibers or loose fibers.

Figure 1:
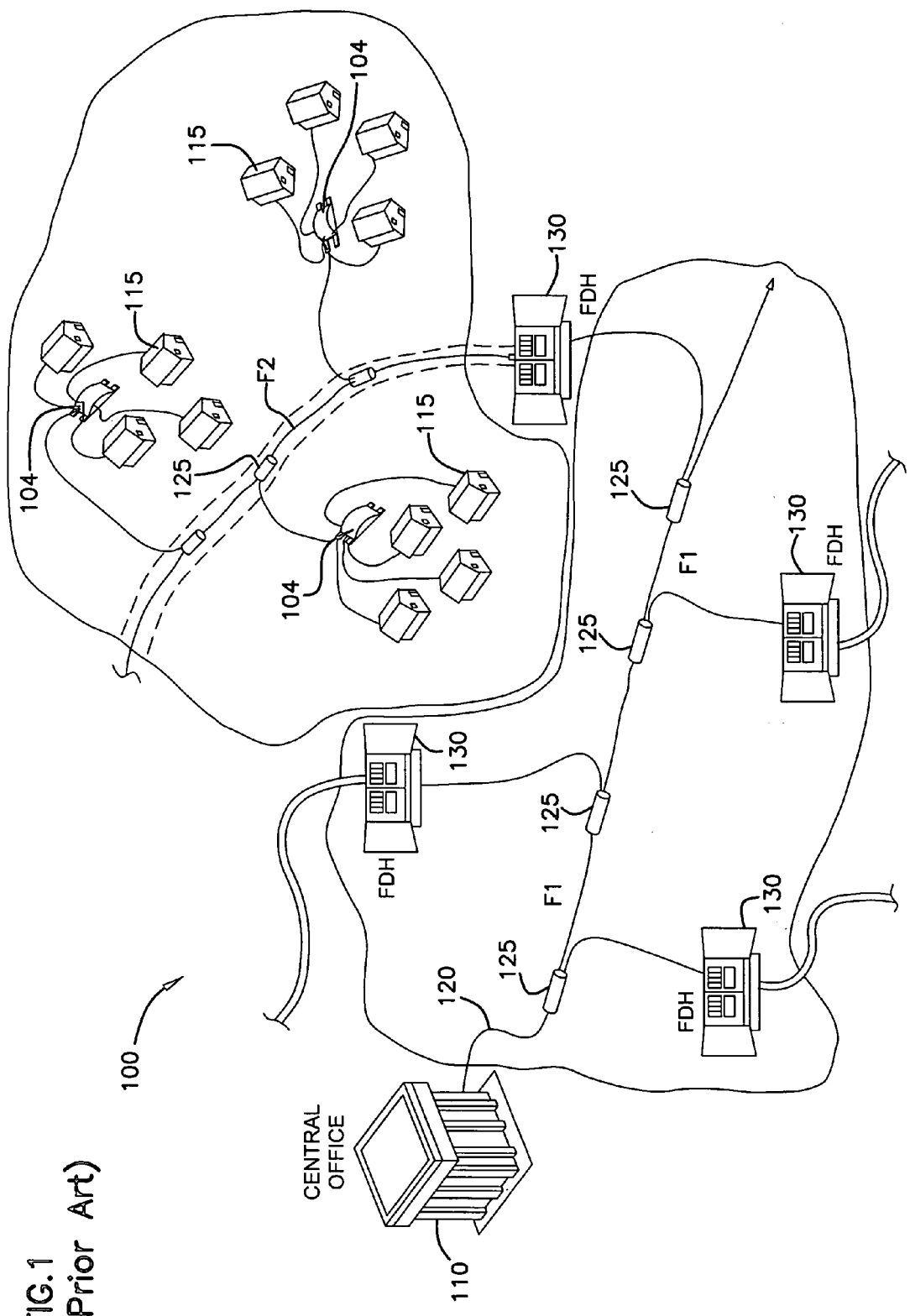
FIG. 1 shows a prior art passive fiber optic network.
Figure 2:
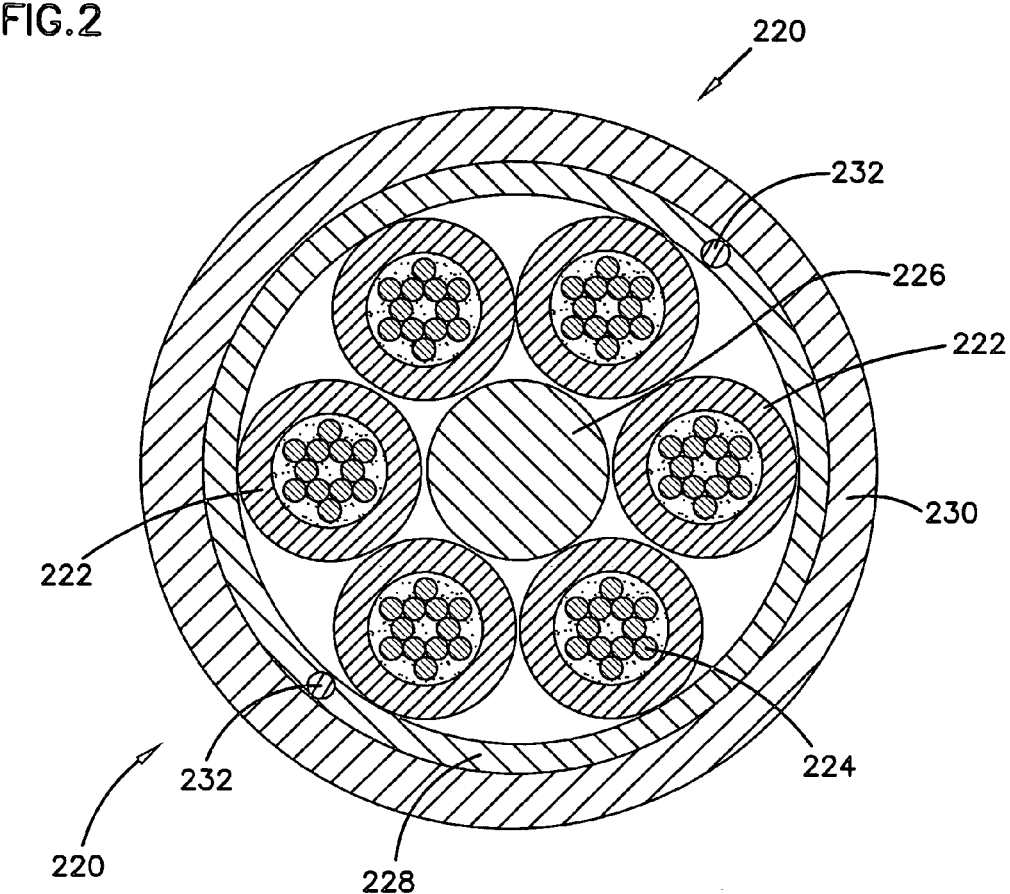
FIG. 2 is a cross sectional view of an example distribution cable.

For example, FIG. 2 shows an example distribution cable 220 including six separate buffer tubes 222 each containing twelve fibers 224. The buffer tubes 222 may be gel filled. The distribution cable 220 also includes a central strength member 226 for reinforcing the cable 220, and an outer strength member 228 such as Kevlar for also reinforcing the cable. The distribution cable 220 further includes an outer jacket 230 that encloses the buffer tubes 222. Ripcords 232 can be provided for facilitating tearing away portions of the jacket 230 to access the fibers 224 within the jacket 230.

While distribution cables typically have a large number of fibers, the various aspects of the present disclosure are also applicable to distribution cables having fewer numbers of fibers (e.g., 2 or more fibers). For example, the distribution cable can include an outer jacket enclosing a single buffer tube and at least two strength members extending on opposite sides of the single buffer tube. An outer strength member such as Kevlar can surround the single buffer tube within the jacket. The single buffer tube can enclose loose fibers or ribbon fibers.

A typical mid-span breakout location is provided at an intermediate point along the length of a distribution cable. Commonly a tether (e.g., a drop cable or a stub cable) branches out from the distribution cable at the breakout location. The tether most commonly has a fewer number of fibers as compared to the number of fibers provided within the distribution cable. In an example embodiment, the tether has no more than twelve fibers. The tether includes fibers that extend between first and second ends. The first ends of the tether fibers are preferably spliced to selected fibers of the distribution cable at the breakout location. The second ends of the tether fibers can either be connectorized or unconnectorized.

Figure 3:
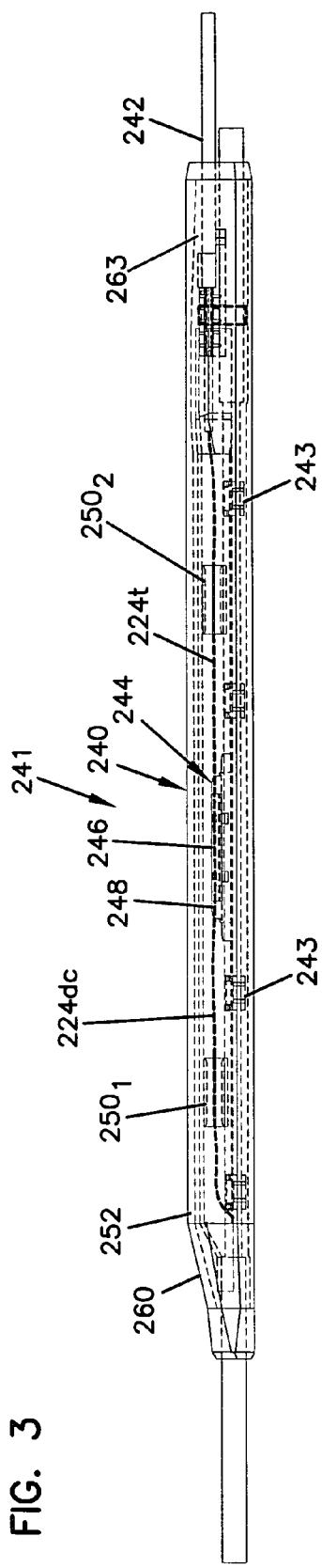
FIG. 3 is a side view of a mid-span breakout location having features that are examples of inventive aspects in accordance with the principles of the present disclosure.
Figure 5:
FIG. 5 is a right end view of the mid-span breakout location of FIG. 3.
Figure 4:
FIG. 4 is a left end view of the mid-span breakout location of FIG. 3.
Figure 6:
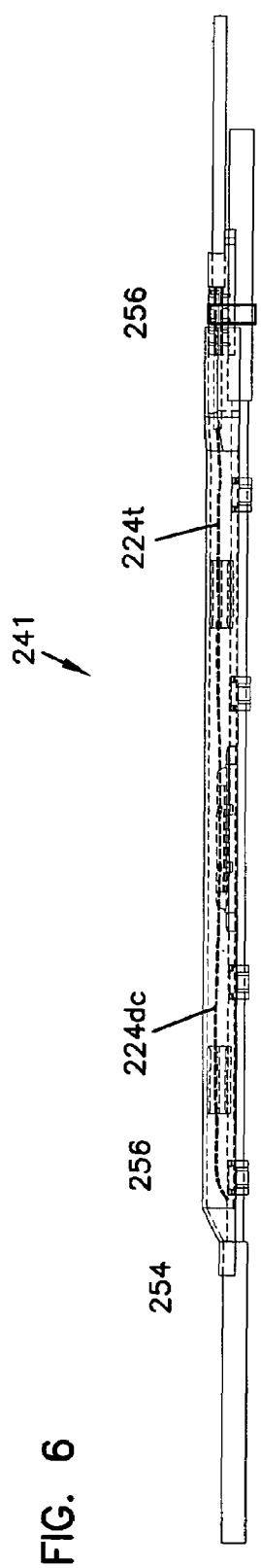
FIG. 6 is a side view of the mid-span breakout location of FIG. 3 with the overmold removed.
Figure 7:
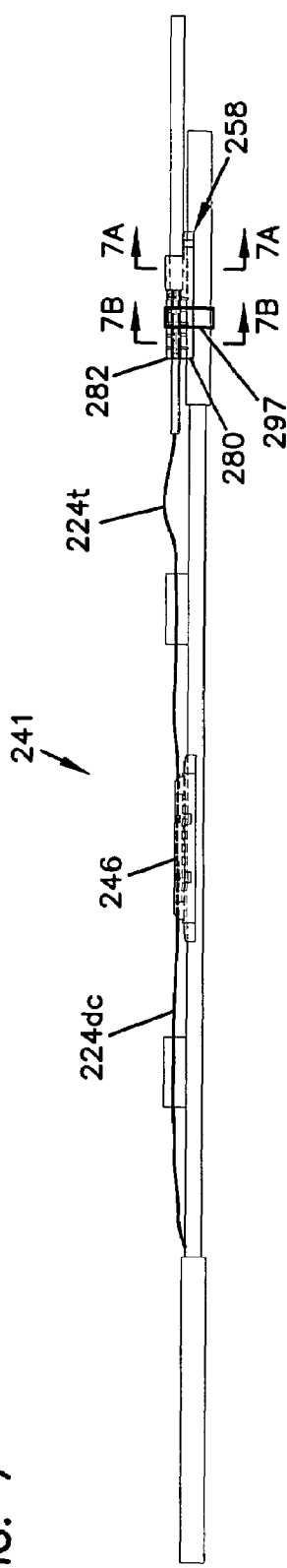
FIG. 7 is a side view of the mid-span breakout location of FIG. 3 with the overmold and protective sleeve removed.

FIGS. 3–7 illustrate a mid-span breakout assembly 240 having features that are examples of inventive aspects in accordance with the principles of the present disclosure. The breakout assembly is positioned at a mid-span breakout location 241. As shown at FIGS. 3, 6 and 7, a tether 242 branches outwardly from a main distribution cable 220 at the mid-span breakout location 241. The breakout location 241 is shown including a splice location 244 where selected fibers $224_{dc}$ of the main distribution cable 220 (e.g., typically less than twelve fibers) are spliced to corresponding fibers $224_t$ of the tether 242. The breakout assembly includes a splice sleeve 246 positioned over the splices, and a splice stiffener 248 for holding the splice sleeve 246. The breakout assembly 240 also includes stiffeners $250_1$, $250_2$ between which the splice stiffener 248 is positioned. The fibers $224_{dc}$ from the distribution cable 220 pass through the stiffener $250_1$ to reach the splice location 244. The fibers $224_t$ from the tether 242 pass through the stiffener $250_2$ to reach the splice location 244. The breakout assembly 240 further includes a protective sleeve 252 (e.g., a shell) that covers the breakout location 241. The stiffeners $250_1$, $250_2$ and the splice stiffener 248 are all enclosed within the sleeve 252. A first end 254 of the sleeve 252 forms a tapered nose, and a second end 256 of the sleeve 252 overlaps a retention block 258 through which the fibers $224_t$ of the tether 242 pass. Retention clips 243 are used to secure the protective sleeve 252 to the distribution cable 220. The breakout assembly 240 also includes an over-mold 260 that encloses and seals the protective sleeve 252, the clips 243 and the retention block 258. In certain embodiments, a wrap of heat resistant tape 263 can provide an intermediate layer between the protective sleeve 252 and the over-mold 260.

Figure 8:
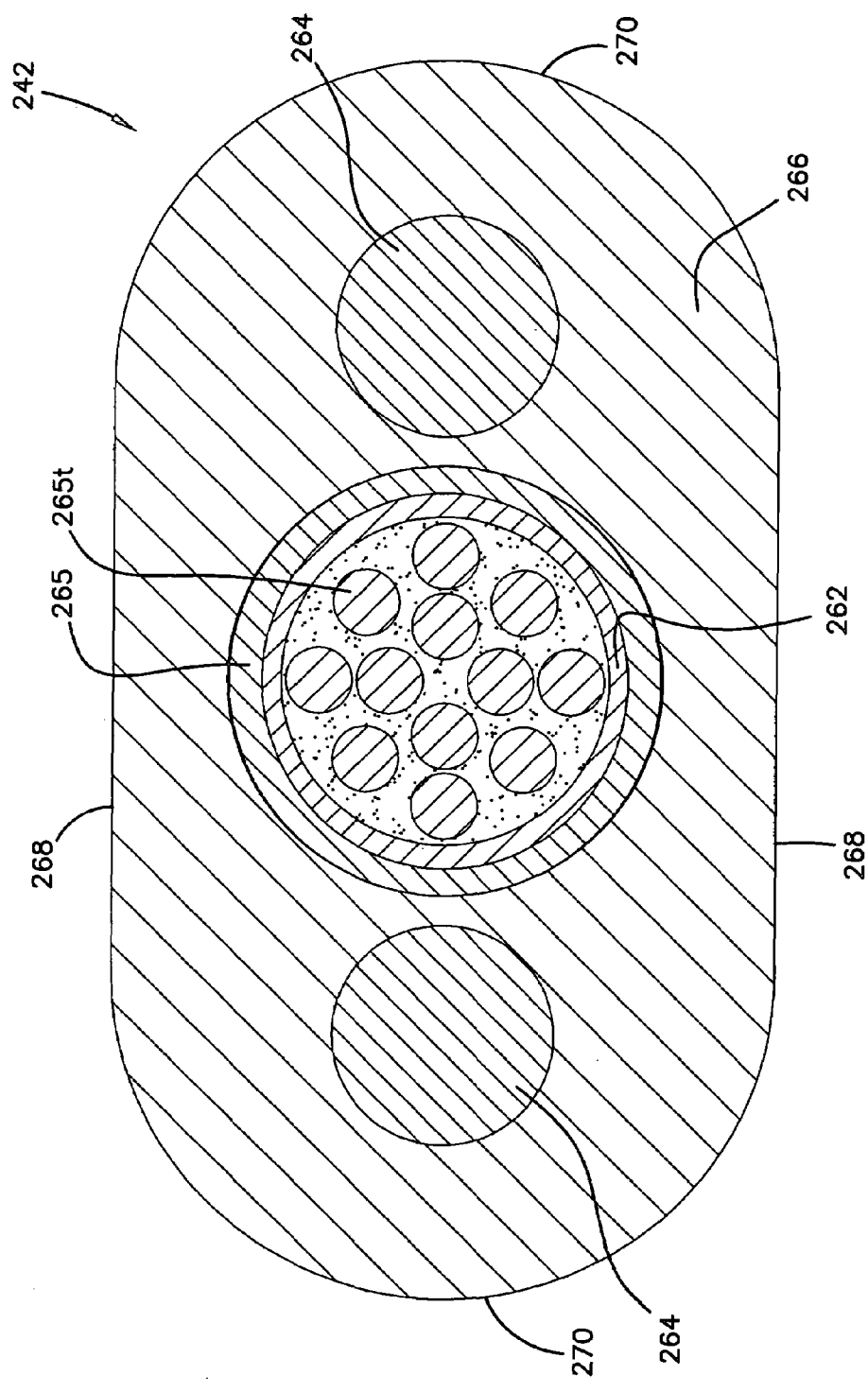
FIG. 8 is a cross sectional view of the tether taken along section line 8—8 of FIG. 7.
Figure 9:
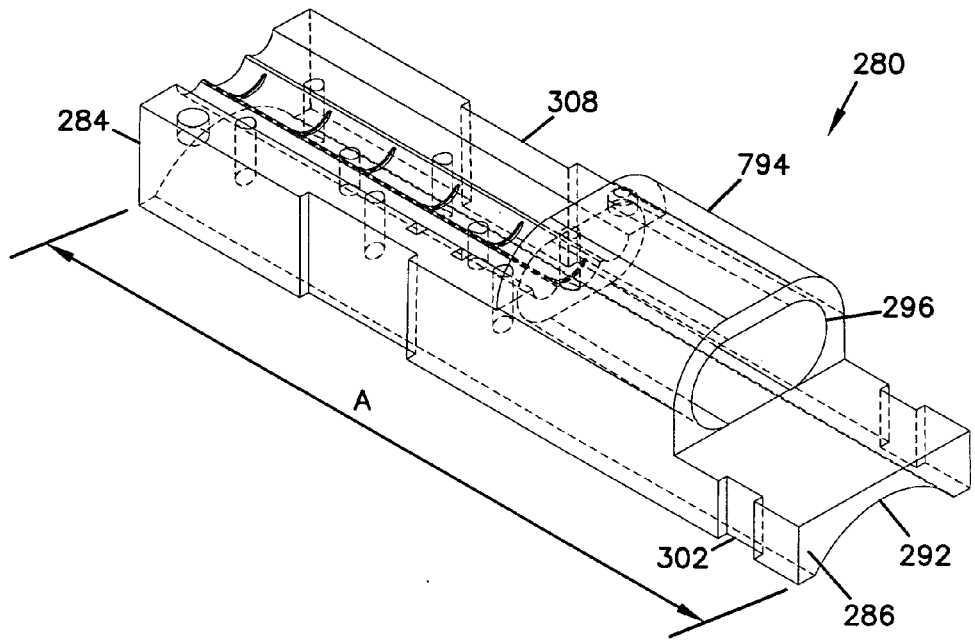
FIG. 9 is a perspective view of a base of a retention block used at the mid-span breakout location of FIG. 3.
Figure 10:
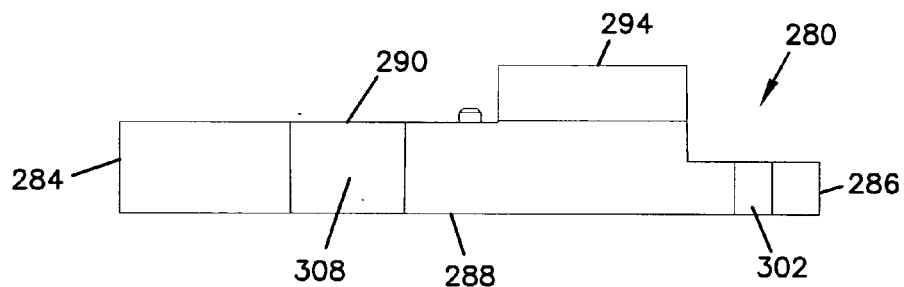
FIG. 10 is a front side view of the base of FIG. 9.
Figure 11:
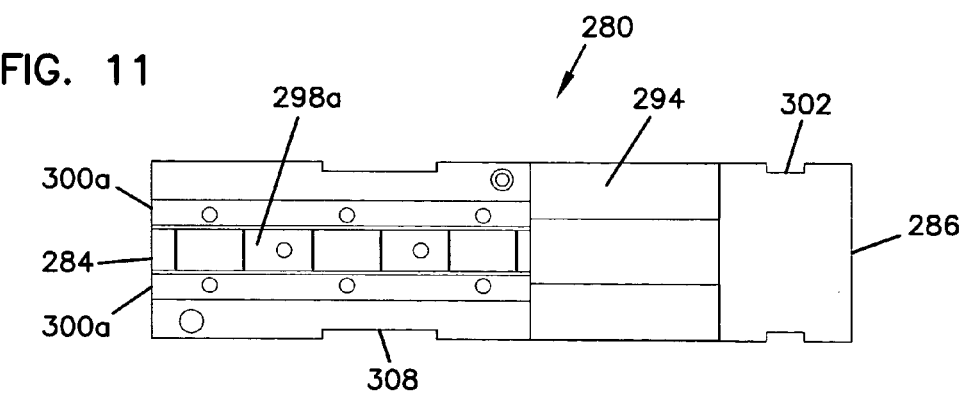
FIG. 11 is a top view of the base of FIG. 9.
Figure 12:
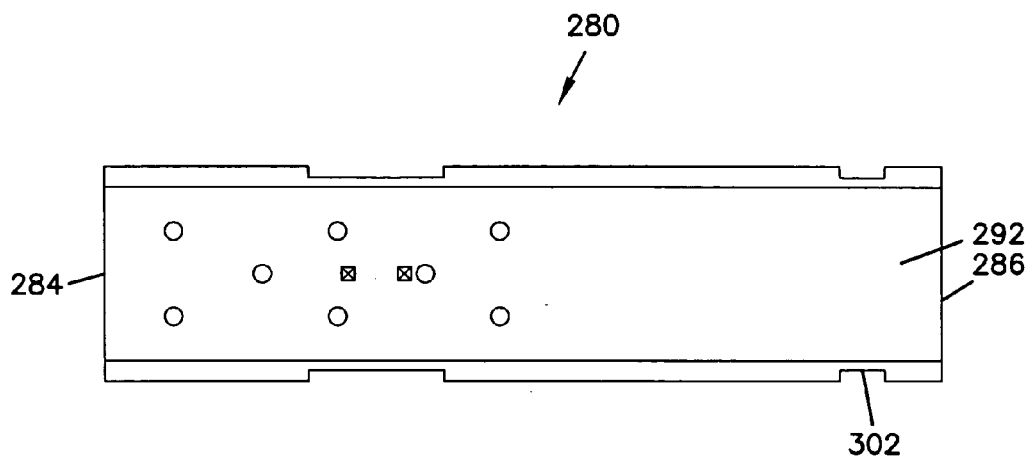
FIG. 12 is a bottom view of the base of FIG. 9.
Figure 13:
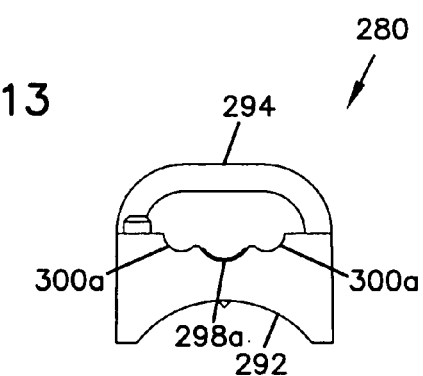
FIG. 13 is a left end view of the base of FIG. 9.
Figure 14:
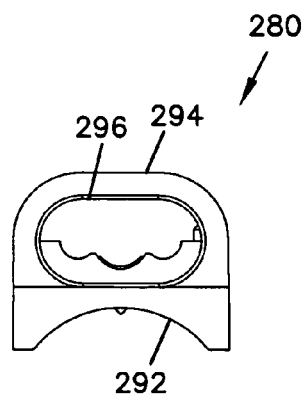
FIG. 14 is a right end view of the base of FIG. 9.
Figure 15:
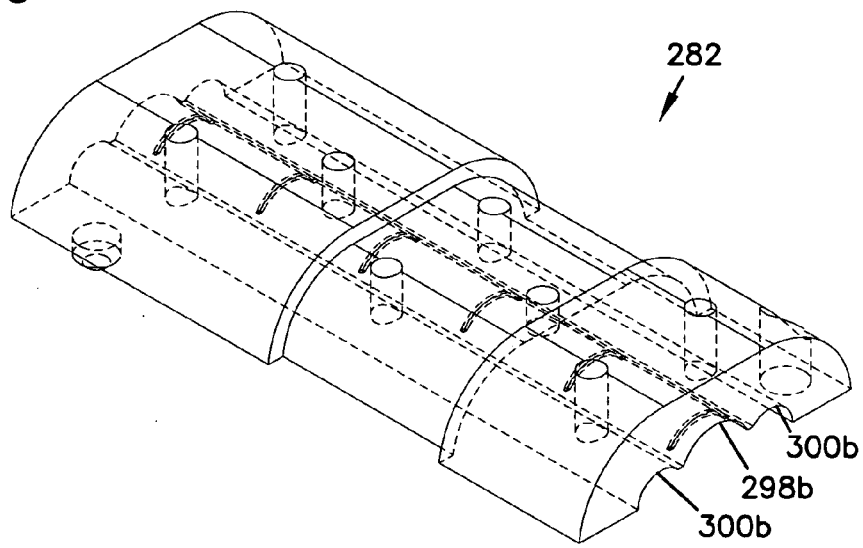
FIG. 15 is a perspective view of a cover adapted to mount to the base of FIG. 9.
Figure 16:
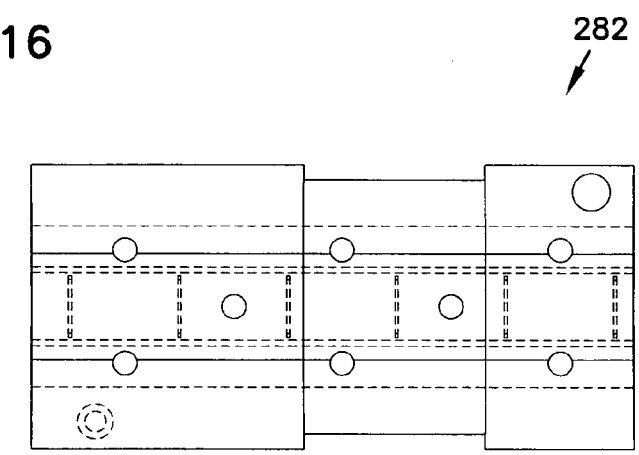
FIG. 16 is a top view of the cover of FIG. 15.
Figure 17:
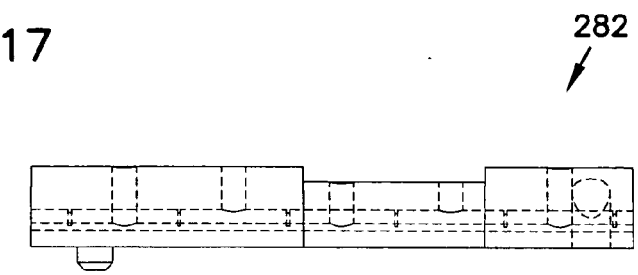
FIG. 17 is a front side view of the cover of FIG. 15.
Figure 18:
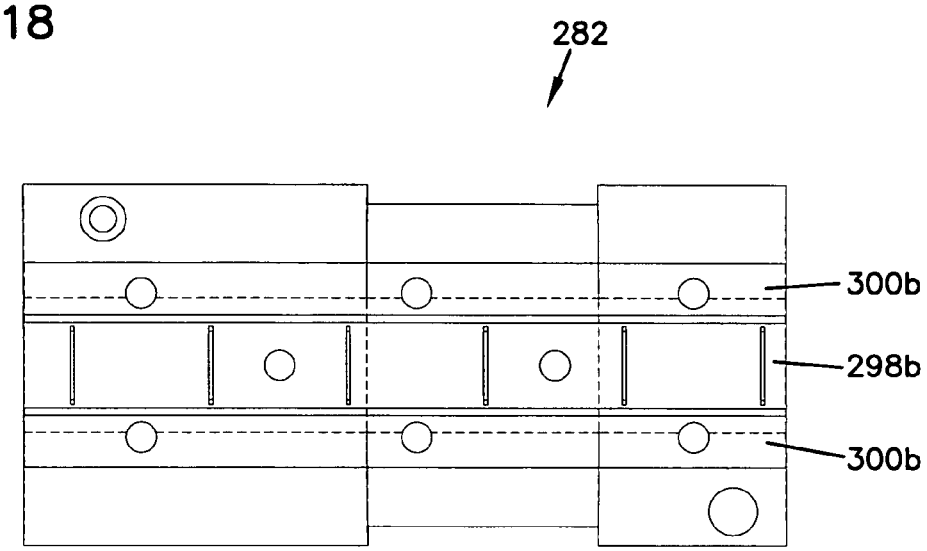
FIG. 18 is an underside view of the cover of FIG. 15.
Figure 19:
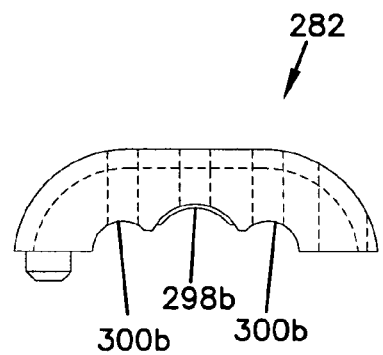
FIG. 19 is a right end view of the cover of FIG. 15.
Figure 20:
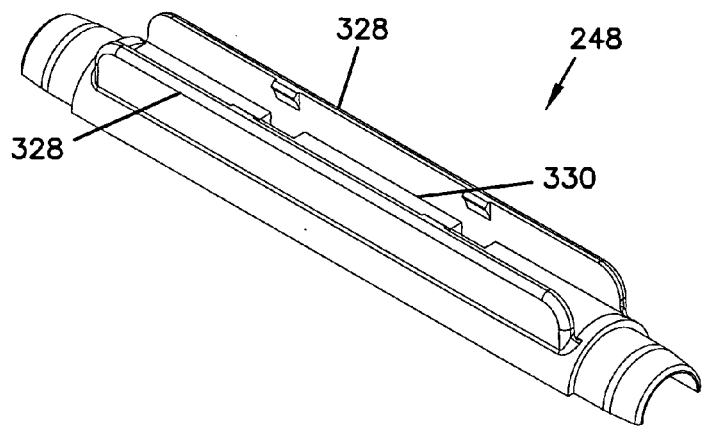
FIG. 20 is a perspective view of a splice stiffener used at the mid-span breakout location of FIG. 3.
Figure 21:
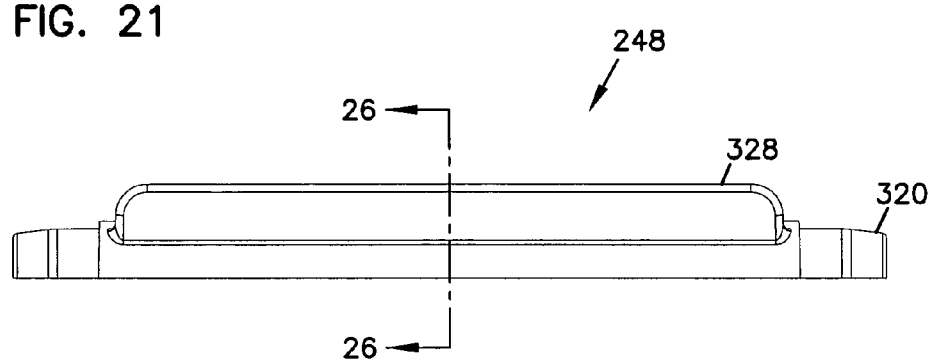
FIG. 21 is a front side view of the splice stiffener of FIG. 20.
Figure 22:
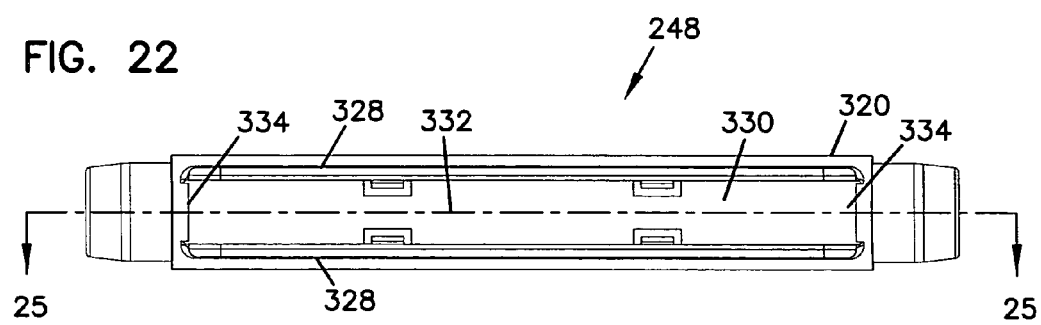
FIG. 22 is a top view of the splice stiffener of FIG. 20.
Figure 23:
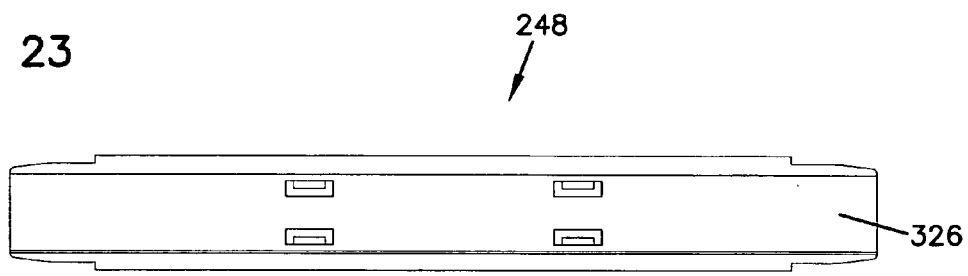
FIG. 23 is a bottom view of the splice stiffener of FIG. 20.
Figure 24:
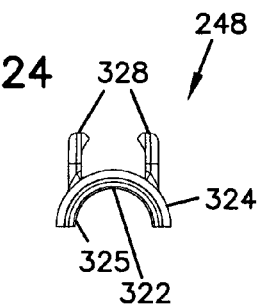
FIG. 24 is a right end view of the splice stiffener of FIG. 20.
Figure 25:
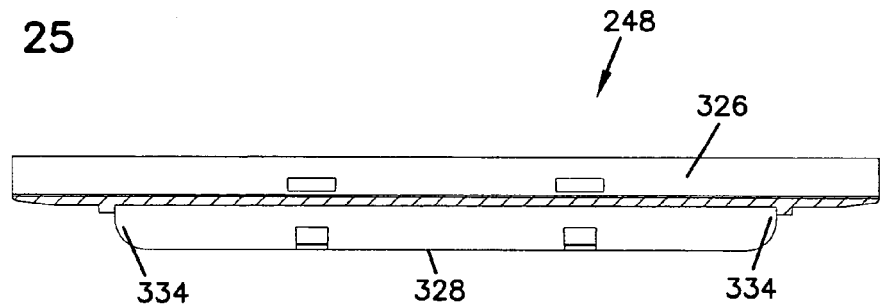
FIG. 25 is a cross sectional view taken along section line 25—25 of FIG. 22.
Figure 26:
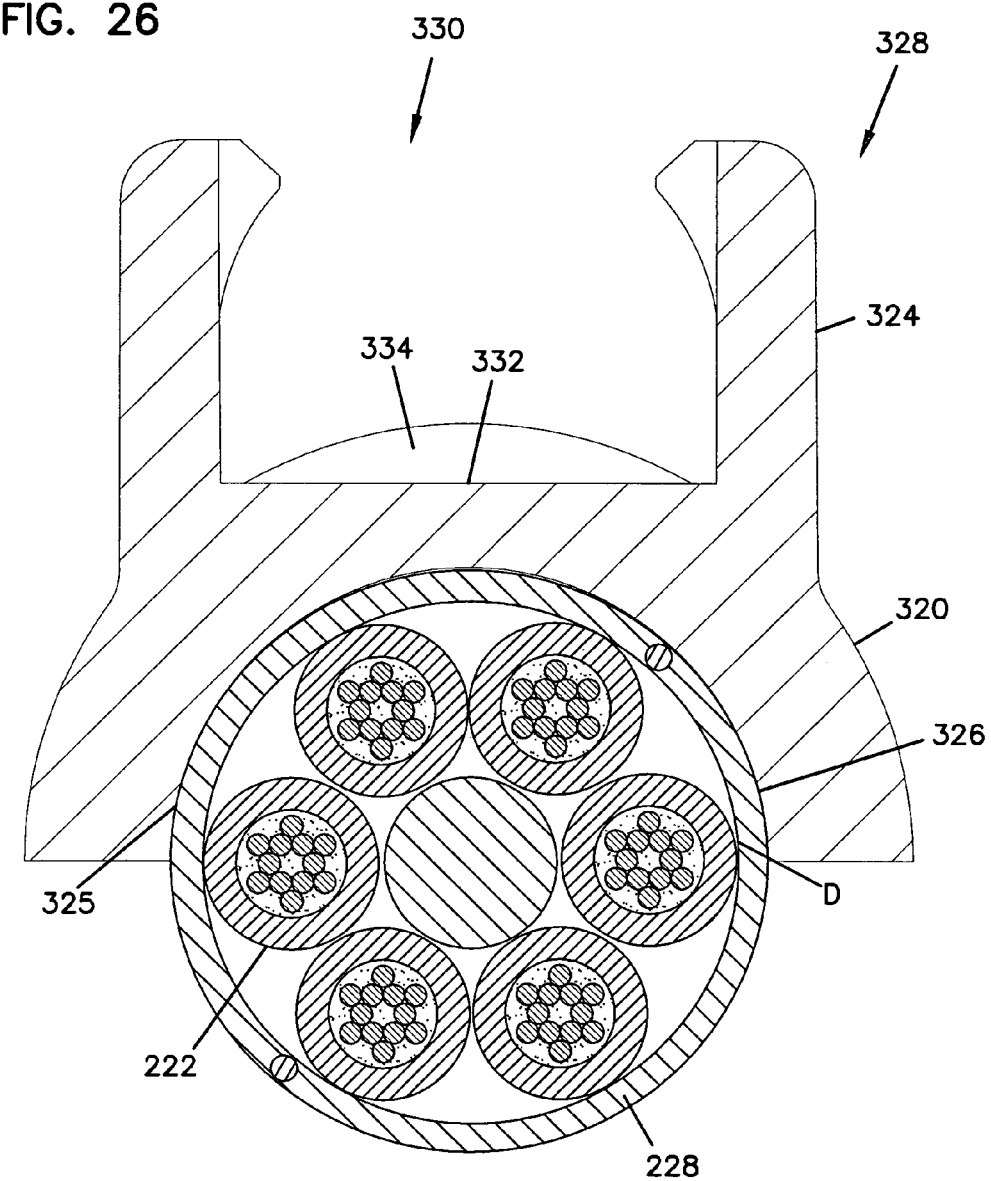
FIG. 26 is a cross sectional view taken along section line 26—26 of FIG. 21, the splice stiffener is shown mounted on a distribution cable.
Figure 27:
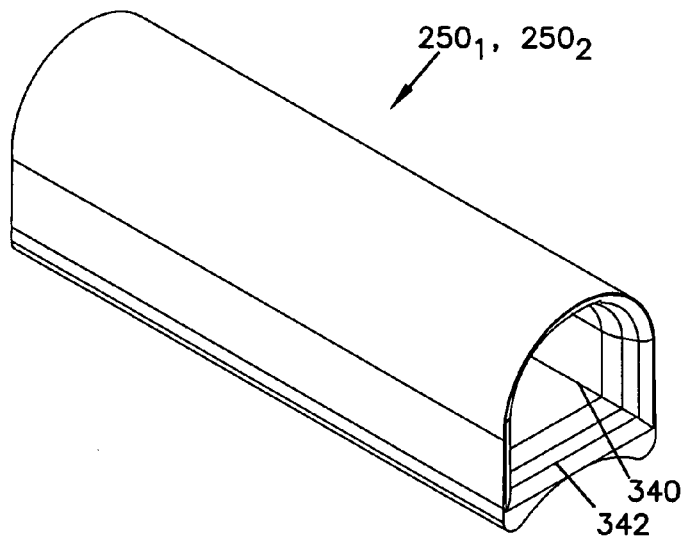
FIG. 27 is a perspective view of a stiffener used at the mid-span breakout location of FIG. 3.
Figure 28:
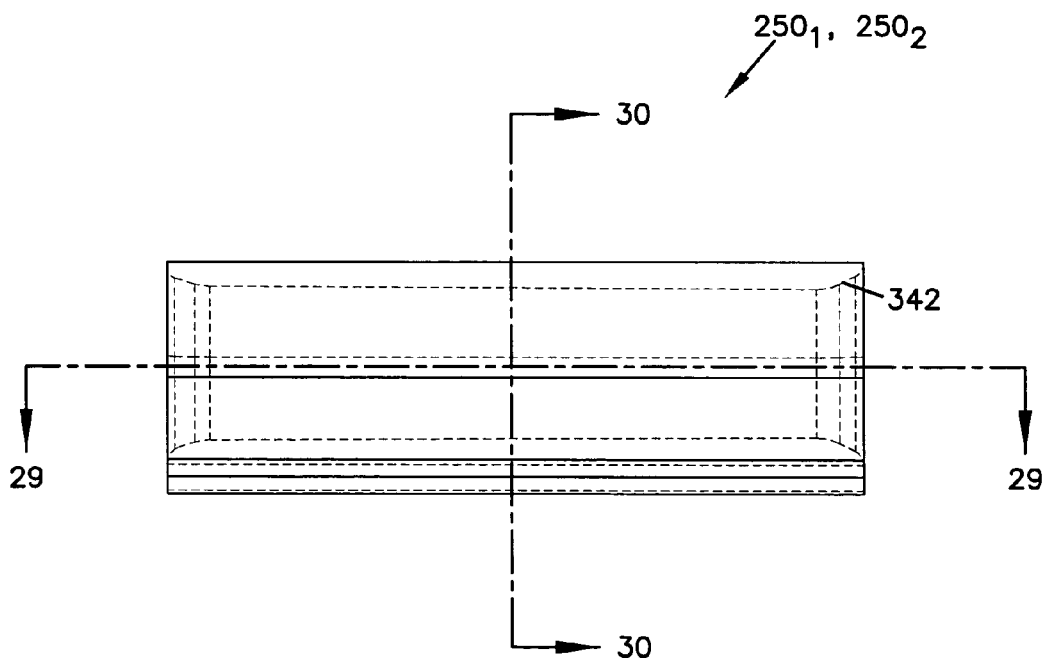
FIG. 28 is a front side view of the stiffener of FIG. 27.
Figure 29:
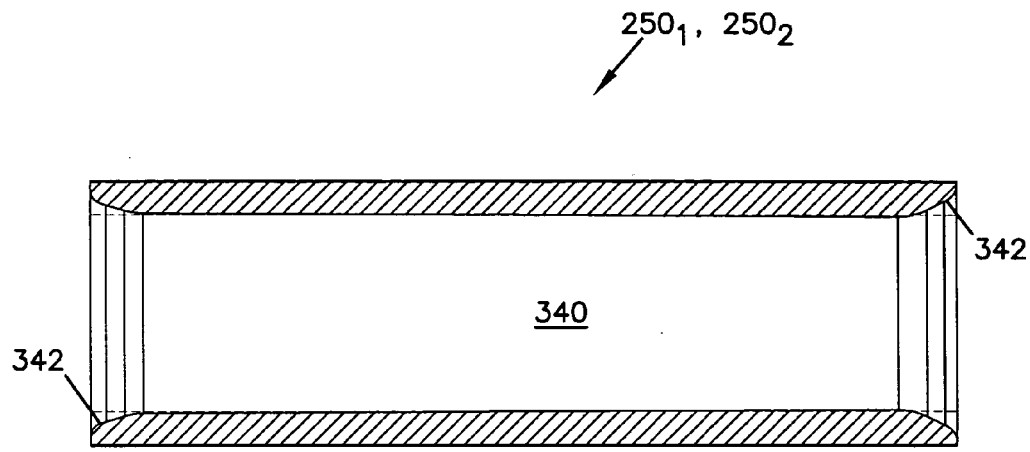
FIG. 29 is a cross sectional view taken along section line 29—29 of FIG. 28.

Referring to FIG. 8, the tether 242 joined to the distribution cable 220 at the breakout location 241 is depicted as having a flat cable configuration. The flat cable configuration includes a central buffer tube 262 containing a plurality of fibers $224_t$ (e.g., typically one to twelve loose or ribbonized fibers). Strength members 264 (e.g., flexible rods formed by glass fiber reinforced epoxy) are positioned on opposite sides of the central buffer tube 262. An outer jacket 266 surrounds the strength members 264 and the buffer tube 262. The outer jacket 266 includes an outer perimeter having an elongated transverse cross-sectional shape. An additional strength layer 265 (e.g., Kevlar) can be positioned between the buffer tube 262 and the outer jacket 266. As shown at FIG. 8, the transverse cross-sectional shape includes oppositely positioned, generally parallel sides 268 interconnected by rounded ends 270.

When the tether 242 is secured to the distribution cable 220, the tether 242 should preferably be able to withstand a pullout force of at least 100 pounds. To meet this pullout force requirement, the retention block 258 is used to strengthen the mechanical interface between the tether 242 and the distribution cable 220. As shown at FIG. 7, the retention block 258 includes a base 280 and a cover 282 between which the tether 242 extends. In one embodiment, the retention block 258 has a plastic construction.

Figure 7A:
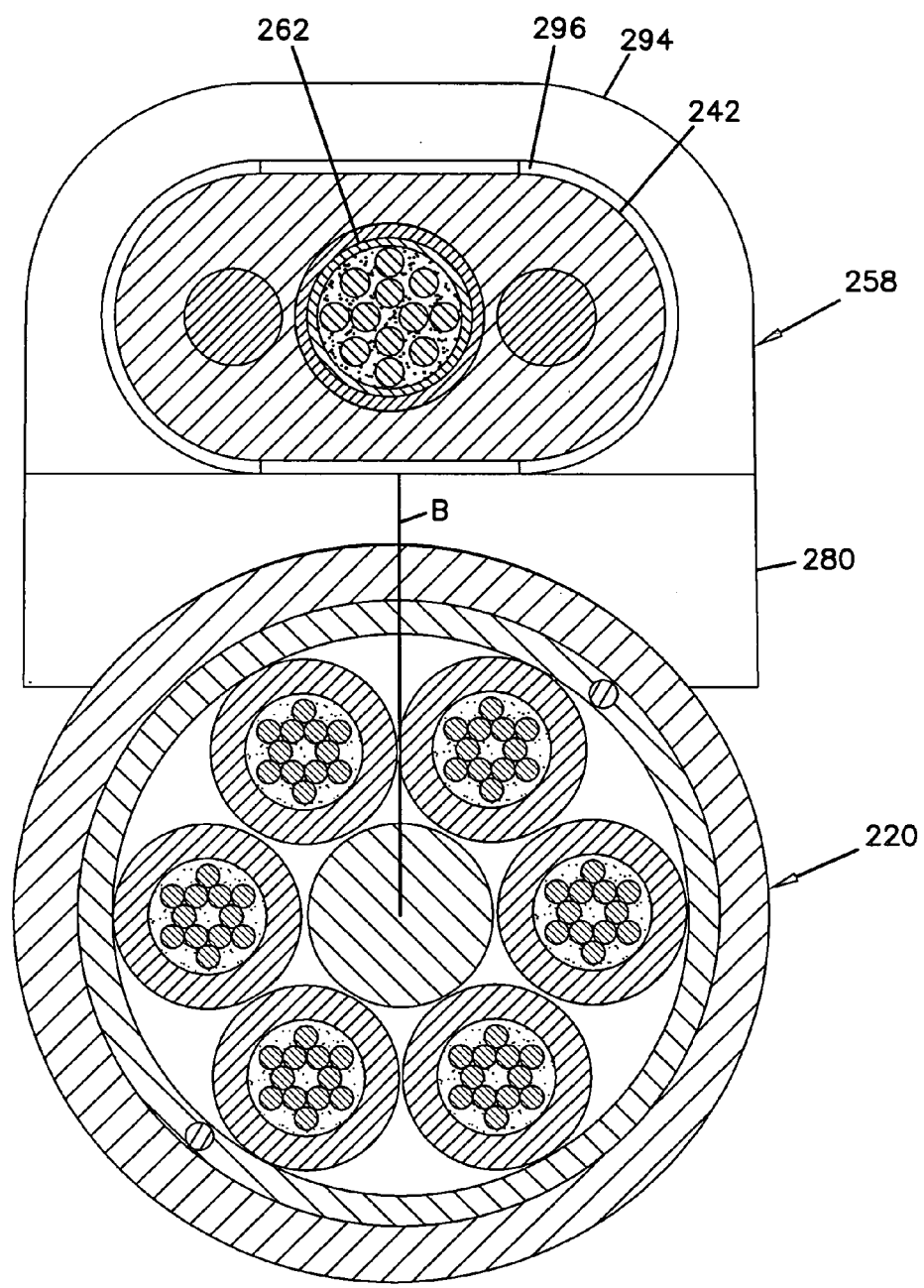
FIG. 7A is a cross sectional view taken along section line 7A—7A of FIG. 7.
Figure 7B:
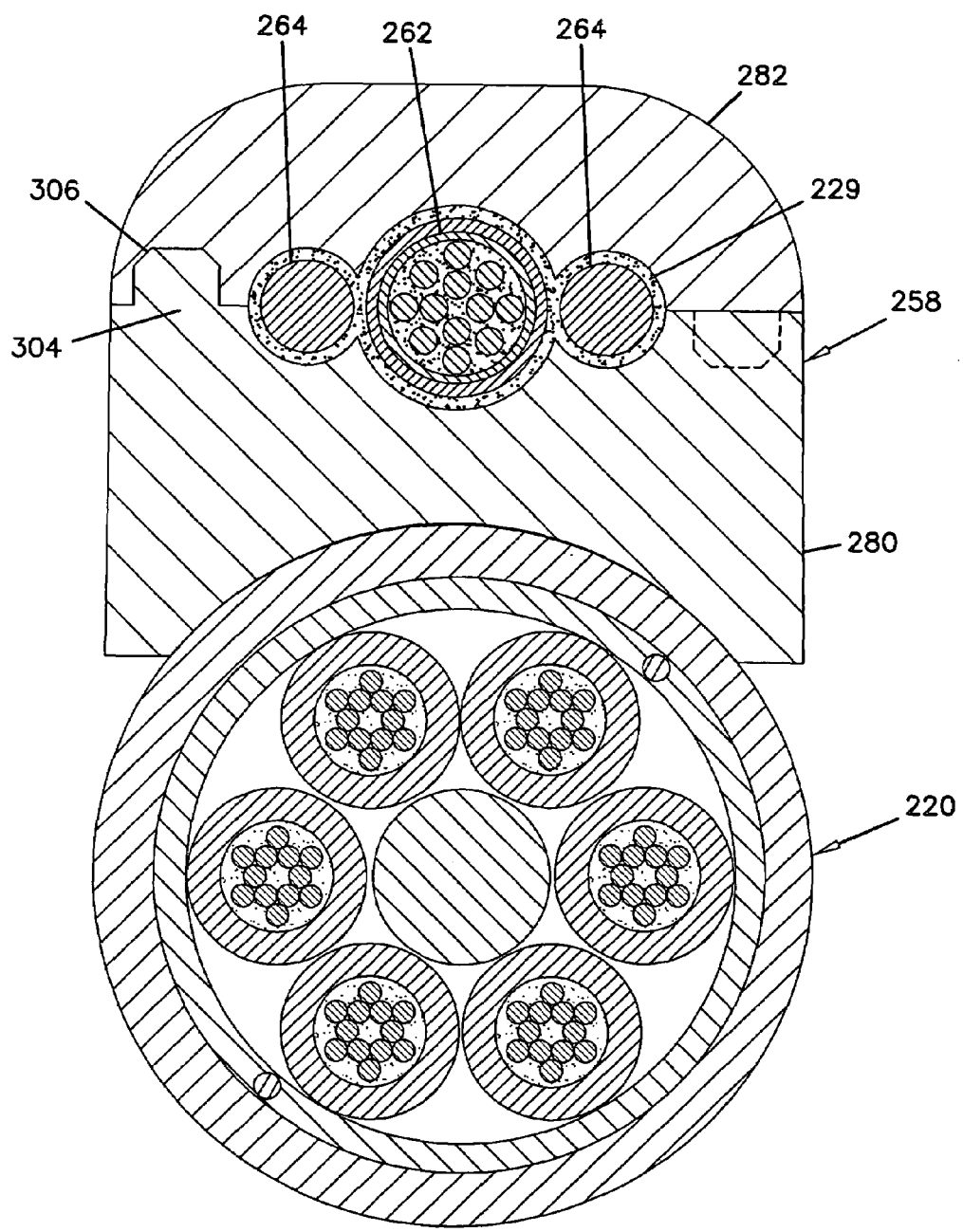
FIG. 7B is a cross sectional view taken along section line 7B—7B of FIG. 7.

Referring to FIGS. 9–14, the base 280 of the retention block 258 includes a first end 284 positioned opposite from a second end 286. The base 280 is elongated along a length A that extends between the first and second ends 284, 286. The base also includes a first side 288 adapted to engage the outer surface of the distribution cable jacket, and a second side 290 adapted to engage the tether 242. The first side 288 has a channel 292 that extends along the length L of the base 280. The channel 292 has a transverse cross-sectional shape that is curved to match the outer diameter of the distribution cable jacket 230. Thus, when the retention block 258 is mounted to the distribution cable 220, the distribution cable 220 nests within the channel 292 as shown at FIGS. 7A and 7B. The second side 290 of the base 280 includes a retention sleeve 294 defining an elongate opening 296 having a transverse cross-sectional shape that matches the transverse cross-sectional shape of the outer perimeter of the tether cable jacket 266. When the tether 242 is secured to the retention block 258, a jacketed portion of the tether 242 fits within the sleeve 294 (see FIG. 7A). When the base is mounted on the distribution cable 220, the opening 296 is elongated in a direction generally perpendicular to a radial line B that extends outwardly from the center of the distribution cable 220. The second side 290 of the base 280 also includes a central groove 298a and two side grooves 300a. The grooves 298a, 300a are generally parallel and extend along the length of the retention block 258. The central groove 298a is sized to receive the buffer tube 262 of the tether 242. The side grooves 300a are sized to receive the strength members 264 of the tether 242.

The base 280 also includes structures for resisting axial movement between the retention block 258 and the overmold 260. For example, as shown at FIGS. 9–12, surface depressions 302 are provided adjacent the second end 286 of the base 280. The surface depressions 302 (e.g., grooves, slots, cuts, notches, indentations) provide void regions for allowing over-mold material to fill-in during the over-molding process to provide a more secure connection between the retention block 258 and the outer over-mold 260. In this way, a mechanical interlock is formed that resists axial movement between the retention block 258 and the over-mold 260. In other embodiments, the base 280 can include outwardly projecting structures (e.g., flanges, bumps, ribs) that are embedded in the over-mold to further resist axial movement between the over-mold and the retention block.

The cover 282 of the retention block 258 mounts over the second side 290 of the base 280 adjacent the first end 284 of the base 280. As shown at FIGS. 15–19, the cover 282 includes a central groove 298b and two side grooves 300b. When the cover 282 is mounted on the base 280, the central groove 298b aligns with the central groove 298a of the base 280, and the side grooves 300b align with the side grooves 300a of the base 280. Thus, when the retention block 258 is assembled, the buffer tube 262 of the tether 242 is captured within the central grooves 298a, 298b, and the strength members 264 of the tether 242 are captured within the side grooves 300a, 300b (see FIG. 7B). An adhesive 299 (see FIG. 7B) can be applied between the cover 282 and the base 280 to securely affix the tether 242 to the retention block 258. In one embodiment, the adhesive 299 is applied to the second side 290 of the base 280, the grooved side of the cover 282, the buffer tube 262 of the tether 242, and the strength members 264 of the tether 242.

The retention block 258 also includes structures for facilitating aligning the cover 282 on the base 280. For example, as shown at FIG. 7B, the retention block 258 can include mating posts 304 and holes 306 provided on the cover 282 and the base 280. The posts 304 fit within the holes 306 to maintain alignment between the base 280 and the cover 282 during assembly.

The retention block 258 further includes an outer band groove 308 (see FIGS. 9 and 15) that extends around at least a portion of the perimeter of the retention block 258. The band groove 308 is sized to receive a strap or band 297 (see FIG. 7) that is wrapped around the retention block 258 and the distribution cable 220 to secure the retention block 258 to the distribution cable 258. The band can also function to assist in holding the cover 282 on the base 280.

The splice stiffener 248 of the breakout assembly 240 preferably has a crush-resistant construction adapted to prevent the splices of the breakout location 241 from being damaged. In one embodiment, the splice stiffener 248 is made of a plastic material. As shown at FIGS. 20–26, the splice stiffener 248 includes an elongated base portion 320 having a generally half-cylinder shape. The base portion 320 includes first and second sides 322, 324 that face in opposite directions. The first side 322 of the base portion 320 includes a concave surface 325 defining a channel 326 having an open side. When the splice stiffener 248 is mounted at the breakout location 241, the concave surface 325 is adapted to face toward the buffer tubes 222 of the distribution cable 220. As shown in the cross-sectional view of FIG. 26, the concave surface 325 has a semi-circular shape having a curvature that generally matches an outer diameter D circumscribing the buffer tubes 322 of the distribution cable 320. The concave surface 325 is shown covering approximately one half the diameter D, and a plurality of the buffer tubes 222 are shown positioned within the channel 326. Depending upon how the breakout location is prepared (i.e., whether or not the outer strength members 228 of the distribution cable 220 have been removed), the layer formed by the strength members 228 may be positioned between the surface 325 and the buffer tubes 222.

The splice stiffener 248 also includes a pair of parallel retaining members 328 that project outwardly from the second side 324 of the base portion 320. A splice retention channel 330 having an open side is defined between the retaining members 328. A bed 332 of the channel 330 is generally planar. Splice sleeve retention ridges or shoulders 334 project outwardly from the bed 332 adjacent opposite ends of the channel 330. Snap fit tabs 336 project laterally into the channel 330 from the retaining members 328. In use, the splice sleeve 246 is snap fit between the tabs 336 and into the channel 330. Once the splice sleeve 246 is in the splice retention channel 330, the tabs 336 prevent the splice sleeve 246 from unintentionally exiting the splice retention channel 330 through the open side. Also, the retention shoulders 334 prevent the splice sleeve 246 from sliding out of the splice retention channel 330 through the ends of the splice retention channel 330. Preferably, the splice sleeve 246 is free to slide back and forth between the shoulders 334 within the channel 330.

The stiffeners $250_1$, $250_2$ of the breakout assembly 240 are preferably configured to provide increased crush resistance to the protective sleeve 252. In certain embodiments, the stiffeners $250_1$, $250_2$ have a stiffer construction than the protective sleeve 252 and are made of a plastic material. Referring to FIGS. 27–30, the stiffeners $250_1$, $250_2$ have a generally tubular configuration and each define a through-passage 340 for receiving their respective fibers $224_{dc}$ and $224_t$. The through-passages 340 preferably have large enough cross-sectional areas to allow the fibers $224_{dc}$, $224_t$ to freely slide therein when the breakout location 241 is bent. Ends 342 of the passages 340 preferably include contours that extend around the perimeter of the passages 340 for preventing the fibers from being bent beyond acceptable bend radius requirements.

Figure 30:
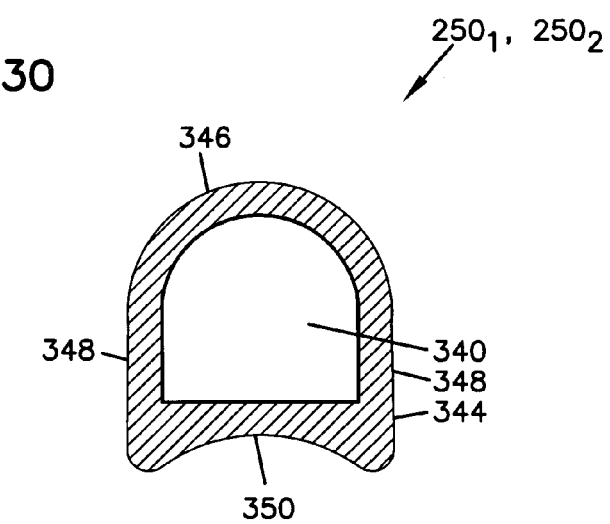
FIG. 30 is a cross sectional view taken along section line 30—30 of FIG. 28.
Figure 36:
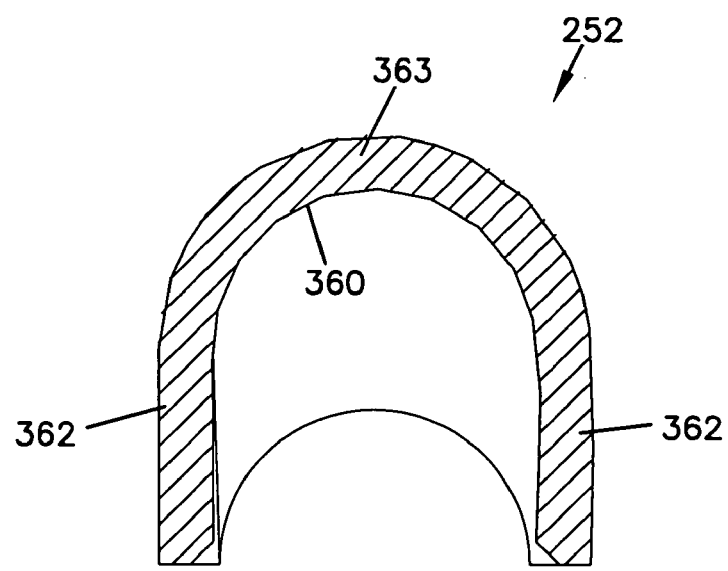
FIG. 36 is a cross sectional view taken along section line 36—36 of FIG. 32.
Figure 37:
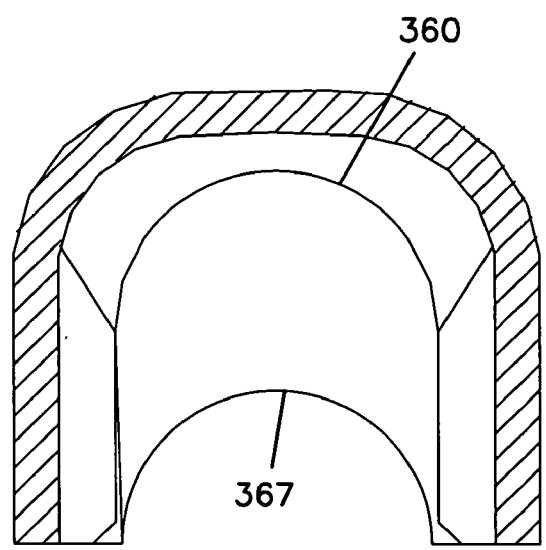
FIG. 37 is a cross sectional view taken along section line 37—37 of FIG. 32.
Figure 38:
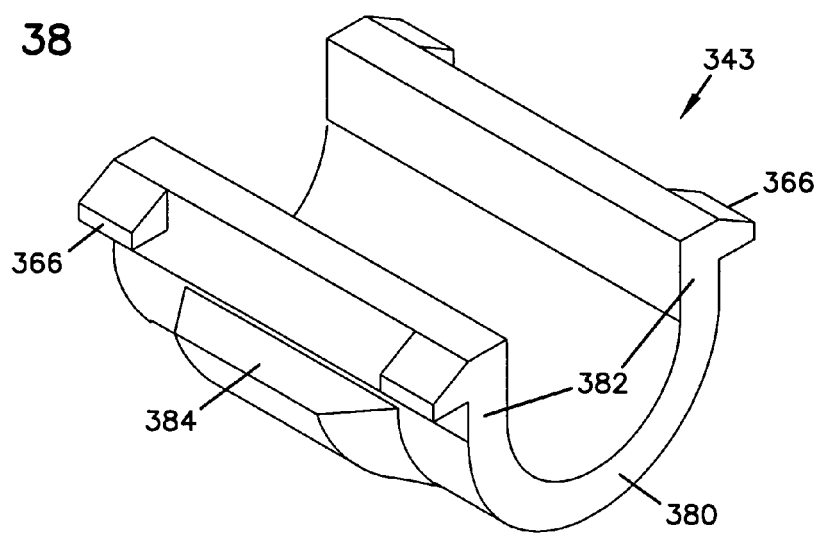
FIG. 38 is a perspective view of a retention clip used to retain the protective sleeve of FIG. 31 at the mid-span breakout location of FIG. 3.
Figure 39:
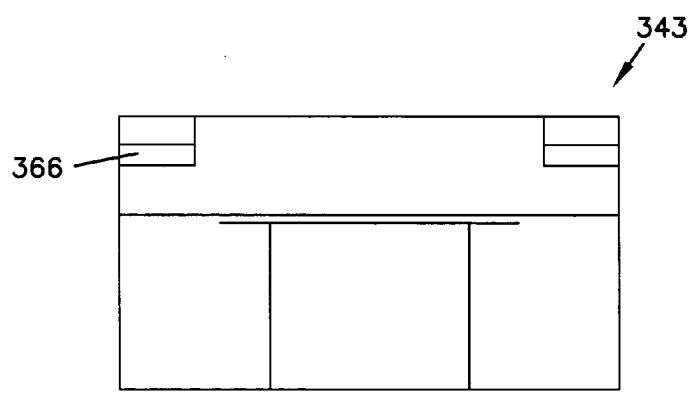
FIG. 39 is a front side view of the retention clip of FIG. 38.
Figure 40:
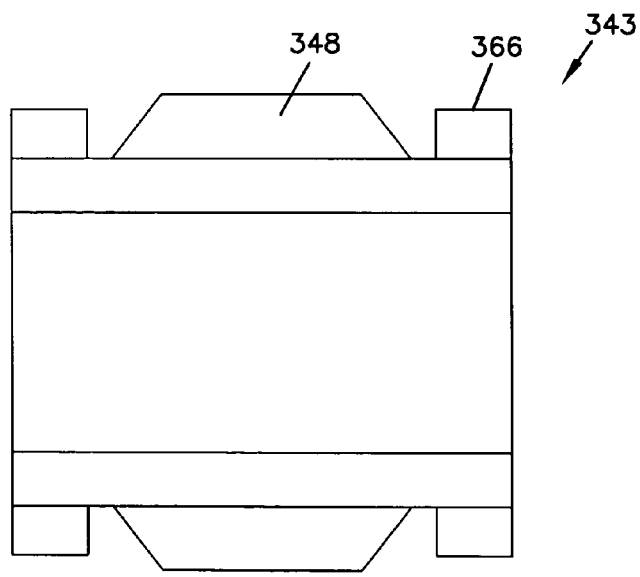
FIG. 40 is a top view of the retention clip of FIG. 38.
Figure 41:
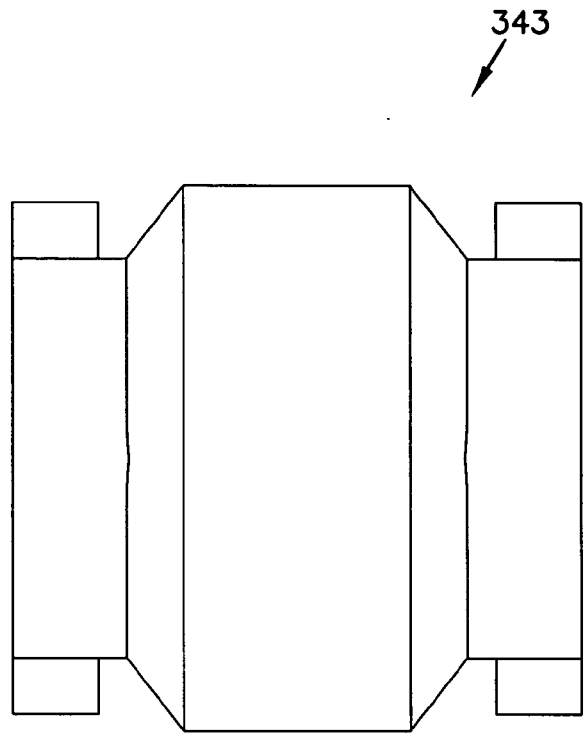
FIG. 41 is a bottom view of the retention clip of FIG. 38.
Figure 42:
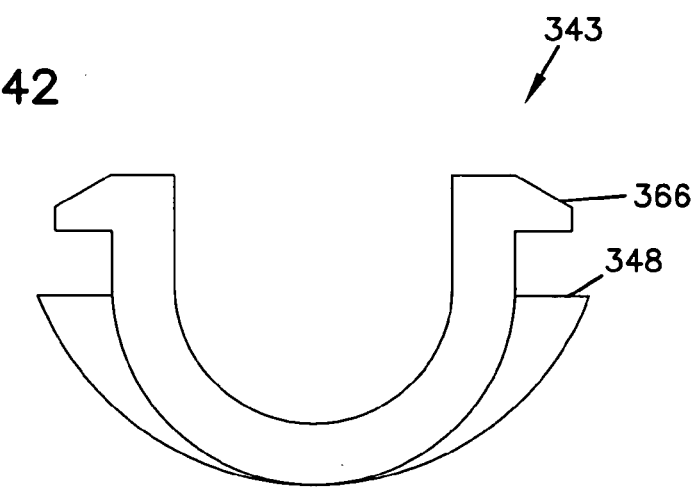
FIG. 42 is a right end view of the retention clip of FIG. 38.
Figure 43:
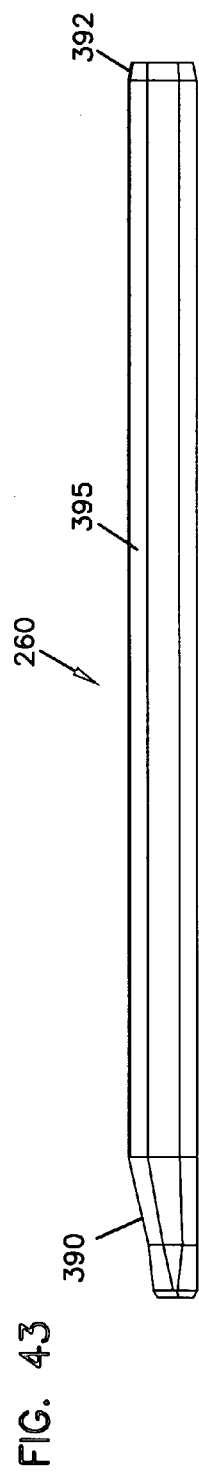
FIG. 43 is a side view of an overmold used at the mid-span breakout location of FIG. 3.
Figure 44:
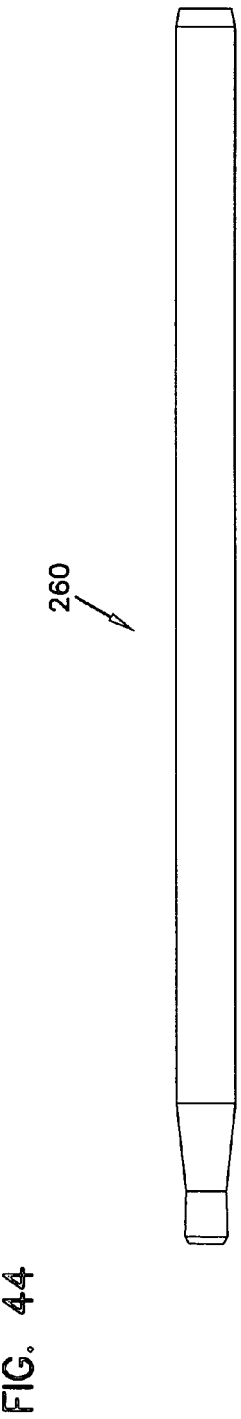
FIG. 44 is a top view of the overmold of FIG. 43.
Figure 45:
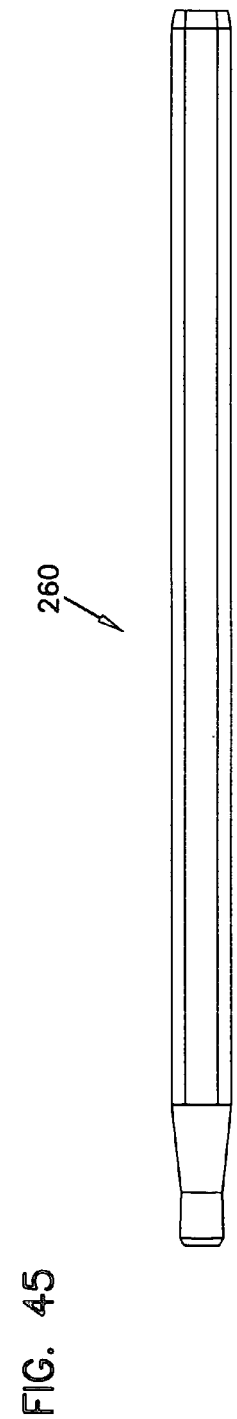
FIG. 45 is a bottom view of the overmold of FIG. 43.
Figure 46:
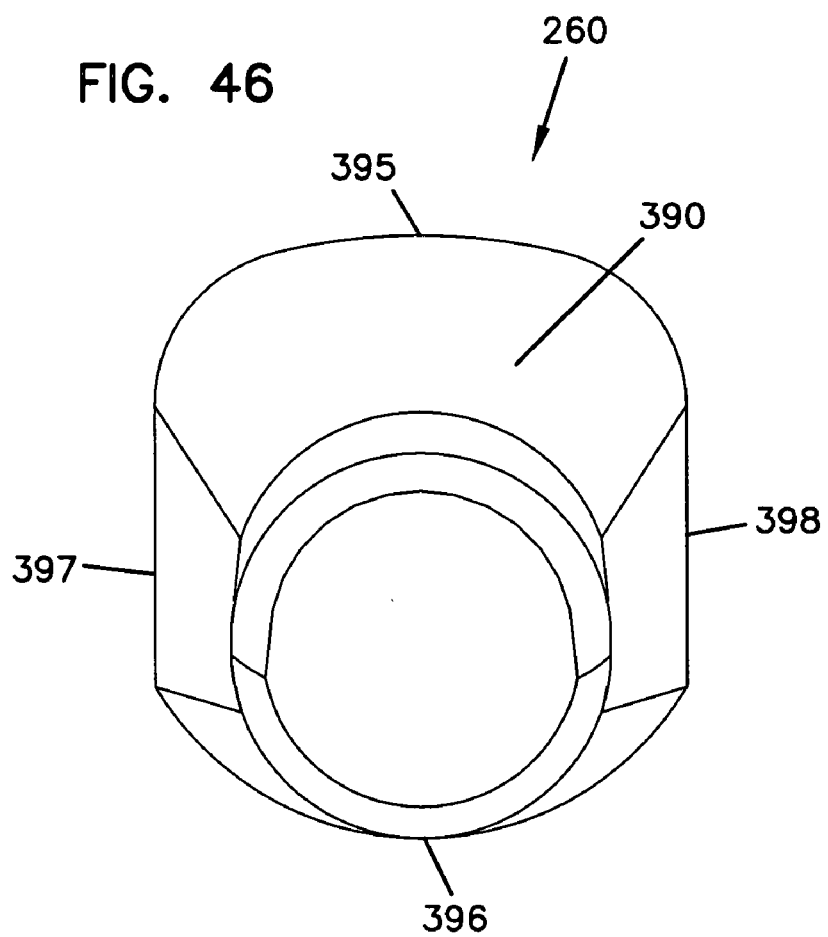
FIG. 46 is a left end view of the overmold of FIG. 43.

Referring to FIG. 30, the stiffeners $250_1$, $250_2$ each include a base portion 344 spaced from an arcuate dome portion 346. The stiffeners $250_1$, $250_2$ each also include a pair of planar, generally parallel side walls 348 that connect the base portion 344 to the dome portion 346. The base portions 344 define concave channels 350 adapted to receive buffer tubes 222 of the distribution cable 220 when the stiffeners $250_1$, $250_2$ are positioned at the breakout location 241. The sidewalls 348 and the dome portion 346 define an exterior shape that generally matches the interior shape of the protective sleeve 252.

The protective sleeve 252 of the mid-span breakout assembly 240 is adapted to form a protective shell over the breakout location 241. The protective sleeve 252 is preferably sufficiently flexible to allow the pre-terminated cable (i.e., the distribution cable 220 with the tethers terminated 242 thereto) to be readily stored on a spool. The stiffeners 248, $250_1$, $250_2$ provide regions/segments of increased crush resistance separated by regions/segments of increased flexibility.

Referring to FIGS. 31–37, the protective sleeve 252 is elongated along a length that extends between the first end 254 and the second end 256 and has a generally U-shaped transverse cross section forming a channel 360 (see FIG. 36) with an open side sized to be inserted over the distribution cable. The channel 360 has a cross sectional shape sized to conform generally with the outer cross sectional shape of the stiffeners $250_1$, $250_2$. Preferably, the internal transverse cross sectional shape of the channel 360 is sized to accommodate sufficient slack or excess fiber length to allow the breakout location 241 to be bent without negatively affecting performance or damaging the fibers of the breakout location. The channel 360 of the protective sleeve 252 is defined between opposing sidewalls 362 defining openings 364 for receiving snap-fit tabs 366 of the retention clips 243. The sidewalls 362 are interconnected by a curved portion 363.

The first end 254 of the protective sleeve 252 includes a low profile portion 365 that fits closely to the distribution cable 220. The low profile portion 365 includes a channel 367 that receives the outer jacket 230 of the distribution cable 220. The channel 367 has a diameter that generally matches the outer diameter of the distribution cable 220. The first end 254 also includes a transition portion 369 that provides a smooth taper/contour between the low profile portion 365 and a main body of the protective sleeve 252. The low profile portion 365 and the transition portion 369 cooperate to provide a smooth transition from the distribution cable 220 to the main outer surface of the protective sleeve 252. The smooth taper provided by the first end (i.e., the leading end/nose) of the protective sleeve 252 assists in pulling the cable through underground conduit without snagging the breakout location 241. The second end 256 of the protective sleeve 252 forms an enlarged receptacle 372 sized sufficiently large to receive the retention block 258. A tapered transition portion 370 is provided between the main body of the protective sleeve 252 and the enlarged receptacle 372. When the sleeve 252 is mounted on the distribution cable 220, the low profile portion 365 overlaps the jacket 230 at the upstream end of the breakout location and the enlarged receptacle 372 overlaps the retention block adjacent the downstream end of the breakout location.

As shown at FIGS. 38–42, the retention clips 243 of the mid-span breakout assembly 240 include curved portions 380 that receive the distribution cable 220 on the opposite side of the protective sleeve 252 such that the distribution cable 220 is captured between the clips 243 and the protective sleeve 252. The clips 243 also include straight extensions 382 that project upwardly from the curved portion 380. The extensions 382 of the clips 243 fit inside the protective sleeve 252 and assist in preventing fibers $224_{dc}$, $224_t$ from being pinched between the protective sleeve 252 and the distribution cable 220 or the clips 243. The extensions 382 include snap-fit tabs 366 that fit within the openings 364 of the protective sleeve 252. The clips 243 also include discrete stops 384 for engaging bottom edges of the protection sleeve 252. The stops 384 are located at the exteriors of the clips 343 and project outwardly from the curved portions 380.

The over-mold 260 of the mid-span breakout assembly 240 is preferably made of a polymer plastic material. As shown at FIGS. 43–46, the over-mold 260 has a primary contour 390 at a leading edge configured to coincide generally with the contour of the leading end of the protective sleeve 252. A trailing end 392 of the over-mold 260 is also slightly contoured. The transverse cross sectional shape of the over-mold includes first and second curved portions 395, 396 interconnected by generally planar portions 397, 398.

It is preferred for the over-mold 360 to be sized with a cross sectional shape sufficient to allow the breakout location to be readily passed through a one and one-half inch inner diameter conduit or a one and one-quarter inch diameter conduit. In certain embodiments, the breakout location has a cross sectional area that can be passed through a one inch inner diameter conduit.

The mid-span breakout location 241 is preferably configured to allow the mid-span breakout location to be bent/flexed in any orientation without damaging the fibers $224_{dc}$, $224_t$ and without significantly negatively affecting cable performance. In one embodiment, this flexibility is provided by making sure that the fibers $224_{dc}$, $224_t$ have sufficient excess fiber length (i.e., slack) to allow the breakout location to be bent/flexed the requisite amount. In one embodiment, the fibers $224_{dc}$, $224_t$ that extend along the mid-span breakout location 241 are provided with at least 2% excess fiber length. In other embodiments, the fibers $224_{dc}$, $224_t$ are provided with at least 3% excess fiber length. In still other embodiments, the fibers $224_{dc}$, $224_t$ are provided with an excess fiber length in the range of 1 to 5% or in the range of 2 to 5%. In one example embodiment, the length of the mid-span breakout location 241 is about 32 centimeters and about 1 centimeter of excess fiber length is provided to the fibers $224_{dc}$, $224_t$ as they extend along the mid-span breakout location 241.

Figure 47:
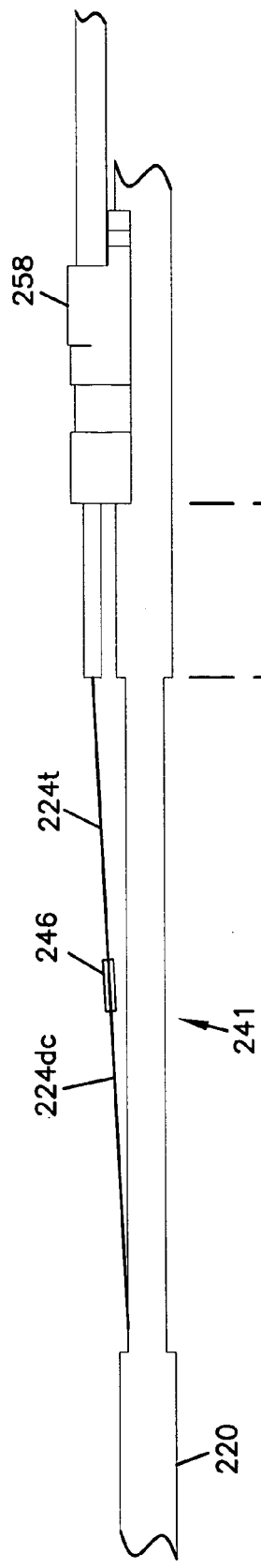
FIGS. 47 and 48 are schematic views showing a method for providing excess fiber length at the mid-span breakout location of FIG. 3.
Figure 48:
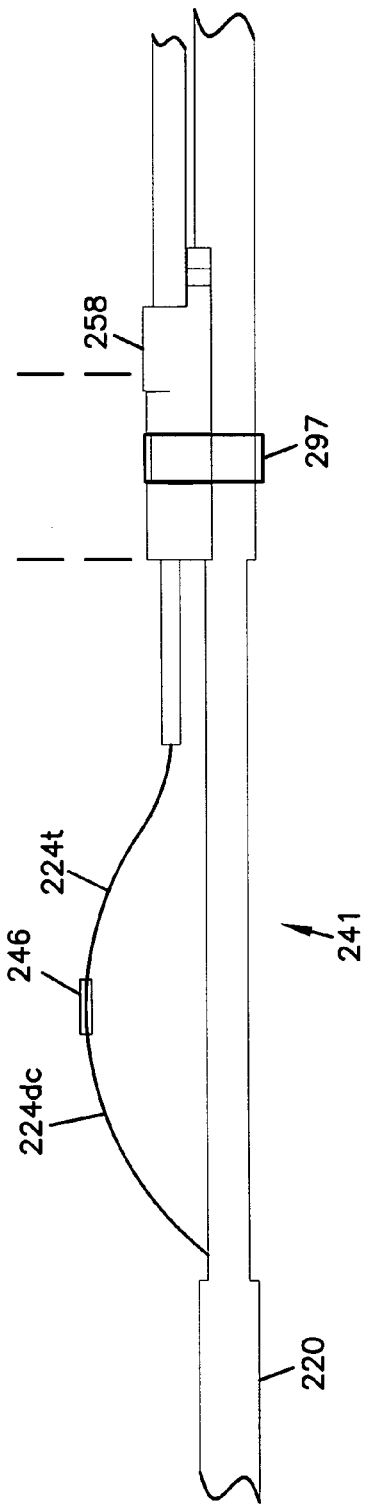

When the mid-span breakout assembly 240 is assembled, measures are taken to provide the fibers $224_{dc}$, $224_t$ with excess fiber length. For example, after the fibers $224_{dc}$, $224_t$ have been fused together, the fibers $224_{dc}$, $224_t$ are pulled taut and the retention block 258 is positioned against the outer jacket 230 of the distribution cable 220 (see FIG. 47). The retention block 258 is then slid a distance X along the distribution cable 220 to the position of FIG. 48. With the retention block 258 in the position of FIG. 48, and adequate amount of excess slack/excess fiber length has been provided to the fibers $224_{dc}$, $224_t$. Once the retention block 258 is in the position of FIG. 48, a securement structure 297 (e.g., a band, strap, clamp or other type of structure) is used to fix the retention block 258 in position relative to the distribution cable 220. Thereafter, the remainder of the mid-span breakout assembly 240 can be assembled over the mid-span breakout location 241.

Figure 49:
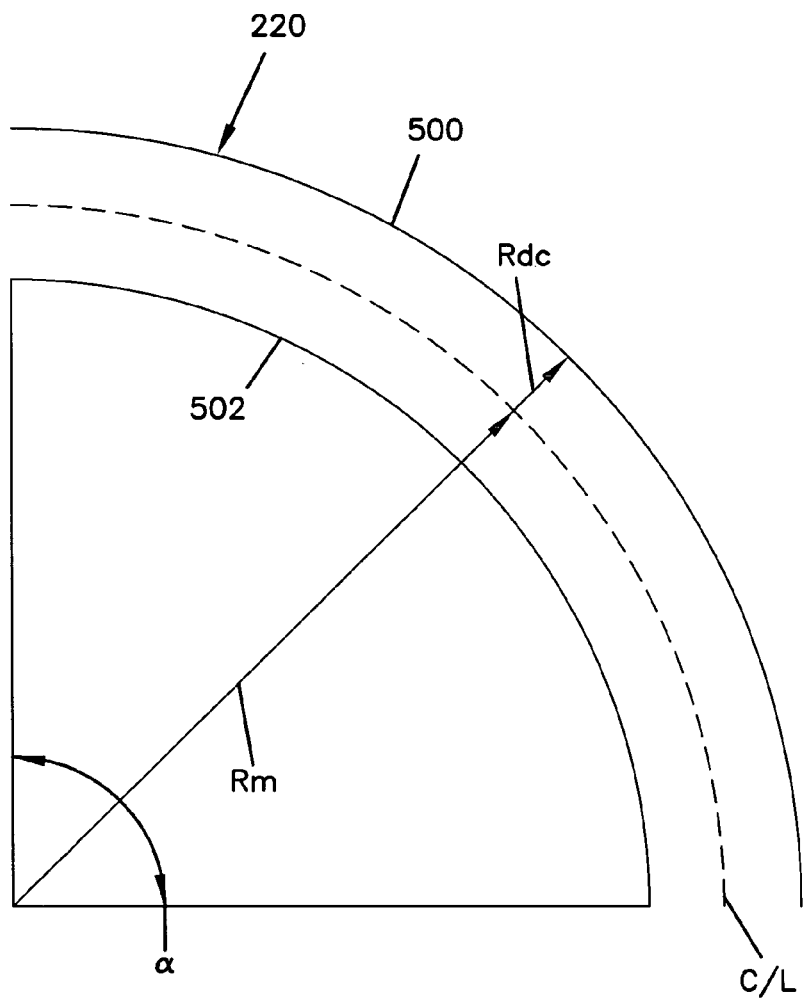
FIG. 49 is a schematic view showing a distribution cable bent along a 90 degree curve at a maximum bend radius.

In determining the amount of excess fiber length to be provided at the mid-span breakout location 241, it is desirable for the distribution cable 220 to be able to be bent in a minimum bend radius $R_m$ in any orientation without compromising the mid-span breakout assembly 240. In one embodiment, an example minimum bend radius $R_m$ is ten times the outer diameter of the distribution cable 220. When the distribution cable is flexed to a bend having a radius $R_m$ as shown at FIG. 49, a portion 500 of the distribution cable 220 at the outside of the curve elongates and a portion 501 of the distribution cable at the inside of the curve shortens. The centerline of the distribution cable does not change in length. Taking the above factors into consideration, the amount of slack fiber length required to accommodate the elongation at the outer portion 500 of the bend can be calculated by the following formula:

$$\alpha \frac{\pi}{180°}(R_m + R_{dc}) - \alpha \frac{\pi}{180°} R_m = \alpha \frac{\pi}{180°} R_{dc}$$

In the above formula, where $R_{dc}$ equals the outer radius of the distribution cable measured from the centerline to the outer surface of the outer jacket. $R_{dc}$ provides a value that is representative of the distance between the fibers $224_{dc}$, $224_t$ and the centerline of the distribution cable. The angle of the bend is represented in $\alpha$ in degrees. For a 90° bend, the excess fiber length equals at least $\pi R_{dc}/2$. For a 180° bend, the excess fiber length equals $\pi R_{dc}$.

To prepare the tether 242 to be incorporated into the mid-span breakout assembly 240, a portion of the outer jacket 266 is stripped away to expose the central buffer tube 262 and the strength members 264 (see FIG. 50). As shown at FIG. 50, the central buffer tube 262 and the strength members 264 project outwardly beyond an end 271 of the outer jacket 266. As shown at FIG. 50, the strength layer 265 has been removed from around the buffer tube 262. After removing the end portion of the outer jacket 266, the strength members 264 are trimmed as shown at FIG. 51, and an end portion of the central buffer tube 262 is removed to expose the fibers $224_t$. The tether 242 is then mounted to the base 280 of the retention block 258. For example, as shown at FIG. 51, the jacketed end 271 of the tether 242 is inserted into the retention sleeve 294. Also, the strength members 264 are positioned within the side grooves 300a of the base 280, and the central buffer tube 262 is inserted within the central groove 298a of the base 280. As shown in FIG. 51, the central buffer tube 262 has a length that extends beyond the first end 284 of the base 280, and the strength members 264 have lengths that terminate generally at the first end of the base 280.

To prepare the mid-span breakout location on the distribution cable 220, a portion of the outer jacket 230 is first stripped away to provide a stripped region 400 having an upstream end 402 and a downstream end 404. Portions of a cable netting can then be removed adjacent the upstream and downstream ends 402, 404 so that the buffer tubes 222 are exposed. The outer strength member 228 can also be displaced (e.g., bunched at the bottom side of the cable) adjacent the ends 402, 404 to facilitate accessing the buffer tubes 222. Tape 406 can be used to prevent the intermediate length of netting that remains at the mid-span breakout location 241 from unraveling. One of the buffer tubes 222 is then selected and a first window 408 is cut into the buffer tube adjacent the upstream end 402 of the stripped region 400 and a second window 410 is cut into the buffer tube 220 adjacent the downstream end 404 of the stripped region 400. The fibers $224_{dc}$ desired to be broken out are then accessed and severed at the second window 410. After the fibers $224_{dc}$ have been severed, the fibers $224_{dc}$ are pulled from the buffer tube 222 through the first window 408 (see FIG. 52). With the distribution cable 220 prepared as shown in FIG. 52, the fibers $224_{dc}$ are ready to be terminated to the prepared tether 242 of FIG. 51.

To connect the tether 242 to the fibers $224_{dc}$, the splice sleeve 246 and the two stiffeners $250_1$, $250_2$ are first slid over the fibers $224_t$ of the tether and up against the retention block 258. In certain embodiments, the stiffeners $250_1$, $250_2$ and splice sleeve 246 can be configured to nest inside one another to minimize the space occupied by such components during the fusion process. In certain embodiments, the components can be slid up over the buffer tube 262 of the tether 242. With the stiffeners $250_1$, $250_2$ and the splice sleeve 246 mounted on the tether 242, the fibers $224_t$ of the tether are fused to the fibers $224_{dc}$ of the distribution cable 220. After the fusion process is complete, the splice sleeve 246 can be slid over the fusion location to protect the splice. The fibers are then tested to confirm that the fibers meet minimum insertion loss requirements. After verifying insertion loss, the cover 282 can be adhesively bonded to the base 280 of the retention block 258 to complete the assembly of the retention block.

Once the retention block 258 has been assembled, the retention block 258 is used to pull the fibers $224_{dc}$, $224_t$ generally taut. With the fibers $224_{dc}$, $224_t$ pulled taut, the splice stiffener 248 is positioned beneath the location of the splice sleeve 246 to ensure that the splice sleeve 246 is generally centered relative to the splice stiffener 248. The splice stiffener 248 can then be secured to the distribution cable 220 with tape. Preferably, the splice stiffener 248 is generally centrally located between the ends 402, 404 of the stripped region 400 of the distribution cable 220.

After the positioning of the splice stiffener 248 has been determined, the retention block 258 is slid back along the distribution cable 220 to provide the fibers $224_{dc}$, $224_t$ with sufficient excess fiber length to allow bending of the mid-span access location. The retention block 258 is then affixed to the distribution cable 220.

Once the retention block 258 has been affixed to the distribution cable 220, the stiffeners $250_1$, $250_2$ are preferably slid along the fibers $224_{dc}$, $224_t$ to their appropriate stiffening positions. In a preferred embodiment, the stiffener $250_1$ is placed generally at a midpoint between the upstream end 402 of the stripped region 400 and the splice stiffener 248, and the stiffener $250_2$ is positioned generally at a midpoint between the splice stiffener 248 and the downstream end 404 of the stripped region 400. Once the stiffeners $250_1$, $250_2$ are in position, the splice sleeve 246 can be snapped within the splice stiffener 248.

To finalize the assembly process, the protective sleeve 252 is secured over the stripped region 400 by the retention clips 243, and the heat resistant tape 263 is wrapped around the mid-span breakout location 241. Thereafter, the process is completed by applying the over mold 260 over the taped mid-span breakout location. The over mold layer functions to seal and protect the underlying components of the mid-span breakout assembly 240. Thereafter, the distribution cable 220 can be spooled. It is preferred for the fibers $224_t$ of the tether to be pre-terminated to the fibers $224_{dc}$ of the distribution cable. "Pre-terminated" means that the fibers $224_t$ are fused or otherwise connected to the fibers $224_{dc}$ of the distribution cable 220 at the factory as part of the cable manufacturing process rather than being field terminated. The remainder of the mid-span breakout assembly is also preferably factory installed.

Referring now to FIGS. 53–79, another example embodiment a mid-span breakout assembly 240' is shown having features that are examples of inventive aspects in accordance with the principles of the present disclosure. The mid-span breakout assembly 240' includes a separation block 700 located on an upstream end 402' of a breakout location 241' and a retention block 600 located on a downstream end 404' of the breakout location 241'. The retention block 600 strengthens the mechanical interface between the tether cable 242 and the distribution cable 220. The separation block 700 routes the optical fibers $224_{dc}$ accessed from the buffer tube 222 of the distribution cable 220 to the splice point with the tether cable 242. A tube 800 extends from the separation block 700 to the retention block 600. The tube 800 protects the spliced optical fibers $224_{dc}$, $224_t$ along the length of the breakout location 241'.

Figure 54:
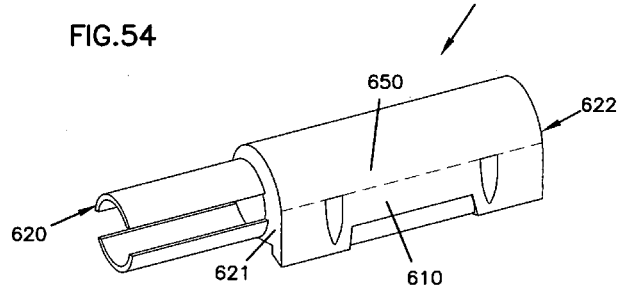
FIG. 54 is a perspective view of an example retention block.
Figure 55:
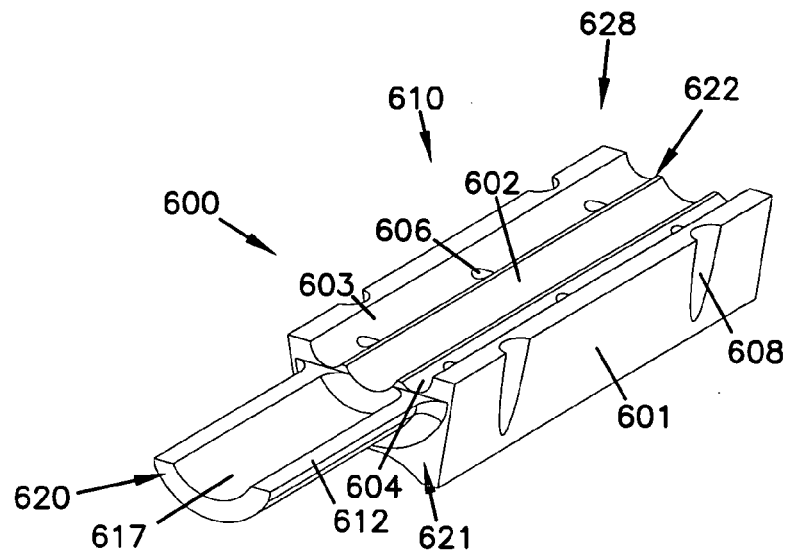
FIG. 55 is a perspective view of a base of the retention block of FIG. 54.
Figure 56:
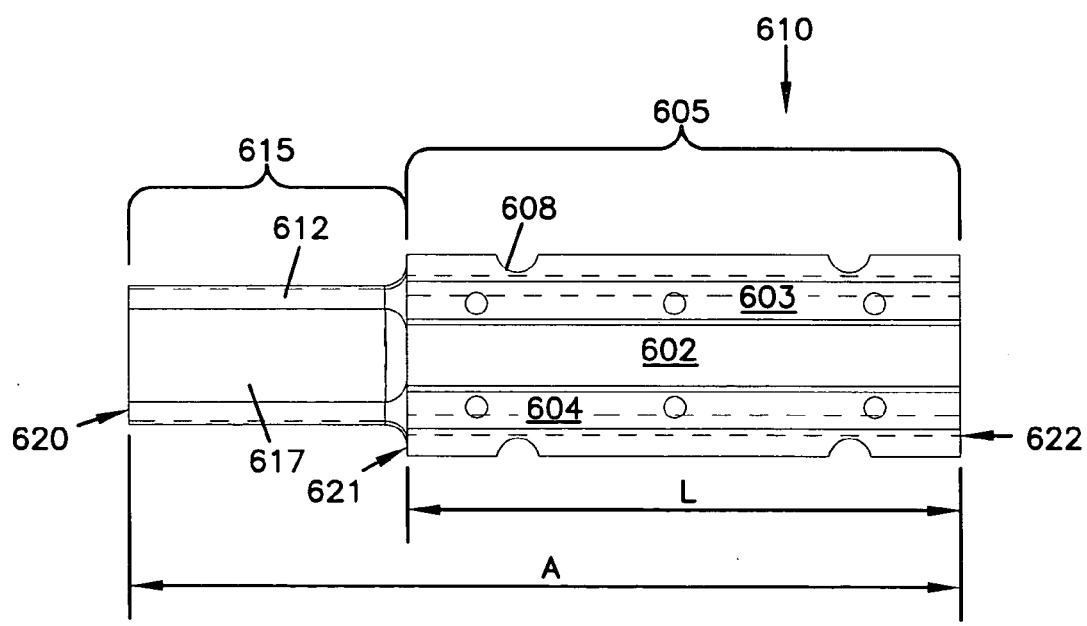
FIG. 56 is a top view of the base of FIG. 55.

As shown in FIG. 54, the retention block 600 includes a base 610 and a cover 650 between which the tether 242 extends. In one embodiment, the retention block 600 has a plastic construction. Referring to FIGS. 55–60, the base 610 of the retention block 600 extends along a length A (FIG. 56) from a first end 620 to a second end 622. The base 610 also includes a first side 626 (FIG. 57) adapted to engage the outer strength member 228 of the distribution cable 220, and a second side 628 (FIG. 55) adapted to engage the tether 242. The base 610 includes a first section 605 and a second section 615 (FIG. 56). The first section 605 of the base 610 includes side surfaces 601, elongated along a length L, that extend from one end 622 of the base 610 to an intermediate end 621 of the base 610. The second section 615 protrudes outwardly from the intermediate end 621 to the end 620 of the base 610.

Figure 53:
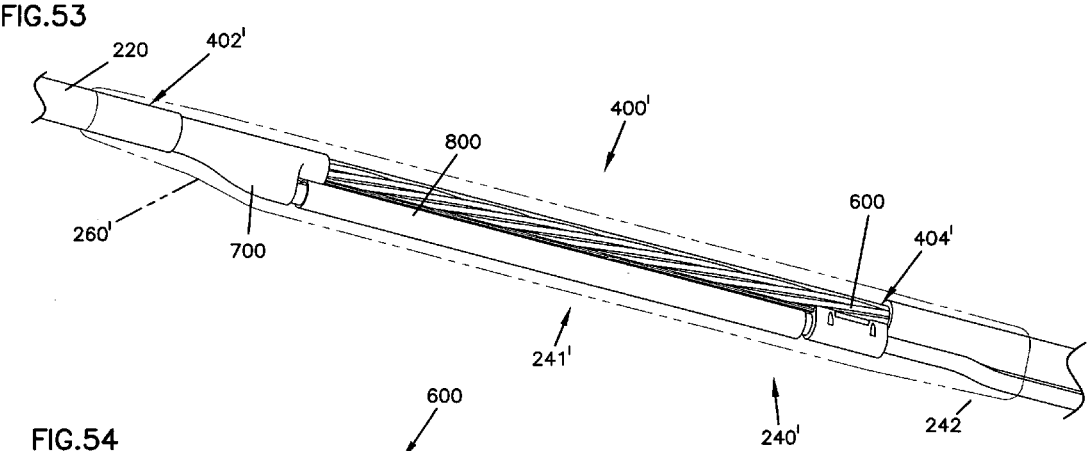
FIG. 53 is a perspective view of an example mid-span breakout assembly.
Figure 57:
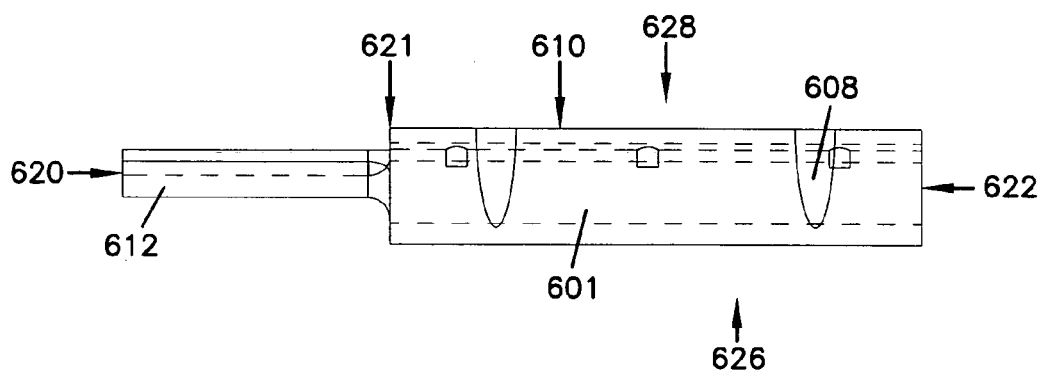
FIG. 57 is a bottom perspective view of the base of FIG. 55.
Figure 58:
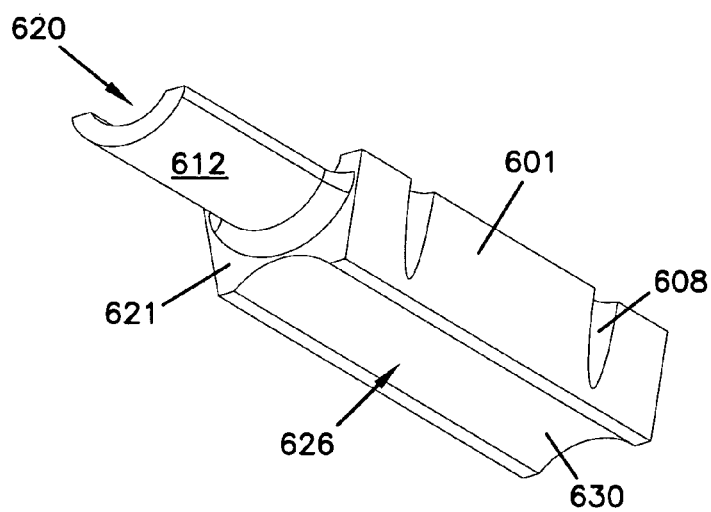
FIG. 58 is a side view of the base of FIG. 55.

The first side 626 of the base 610 has a channel 630 that extends along the length L of the first section 605 (FIG. 57). In some embodiments, the channel 630 has a transverse cross-sectional shape (FIG. 59) that is curved to generally match the inner diameter of the distribution cable jacket 230. The channel 630 of the base 610 is configured to couple to a stripped region of the distribution cable 220 (FIG. 53). In some embodiments, the channel 630 couples to the outer strength member 228 of the distribution cable. In one example embodiment, the outer strength member 228 includes multiple loose strands of Kevlar positioned around the buffer tubes 222. Thus, when the retention block 600 is mounted to the outer strength member 228, the outer strength member 228 and the buffer tubes 222 of the distribution cable 220 nest within the channel 630.

The second side 628 of the first section 605 of the base 610 includes a central groove 602 and two side grooves 603, 604. The grooves 602–604 are generally parallel and extend along the length L of the first section 605 of the base 610.

Figure 59:
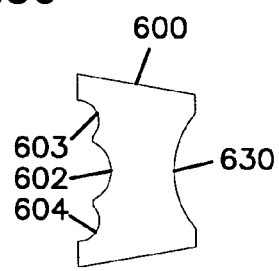
FIG. 59 is a transverse cross-sectional view of the base of FIG. 55.
Figure 60:
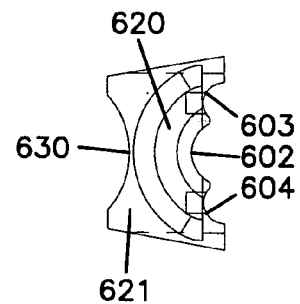
FIG. 60 is a front view of the base of FIG. 55.
Figure 61:
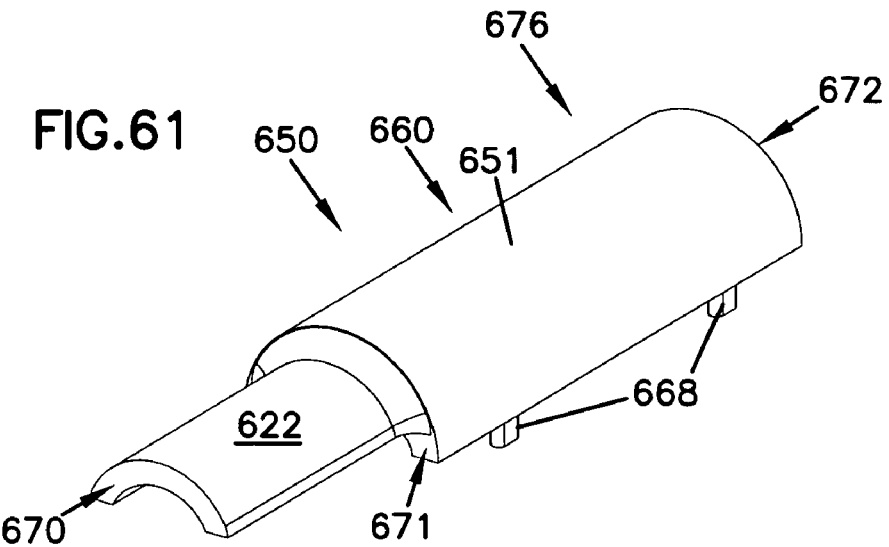
FIG. 61 is a top perspective view of a cover of the retention block of FIG. 54.

A transverse cross-section of the first section 605 is shown in FIG. 59. The central groove 602 is sized to receive the buffer tube 262 of the tether 242. The side grooves 603, 604 are sized to receive the strength members 264 of the tether 242.

The second section 615 of the base 610 includes a transition flange 612 that extends outwardly from the intermediate end 621 of the base 610. In some embodiments, the transition flange 612 has a generally U-shaped transverse cross-section. In one embodiment, the transition flange 612 defines a groove 617 (FIG. 55).

Figure 62:
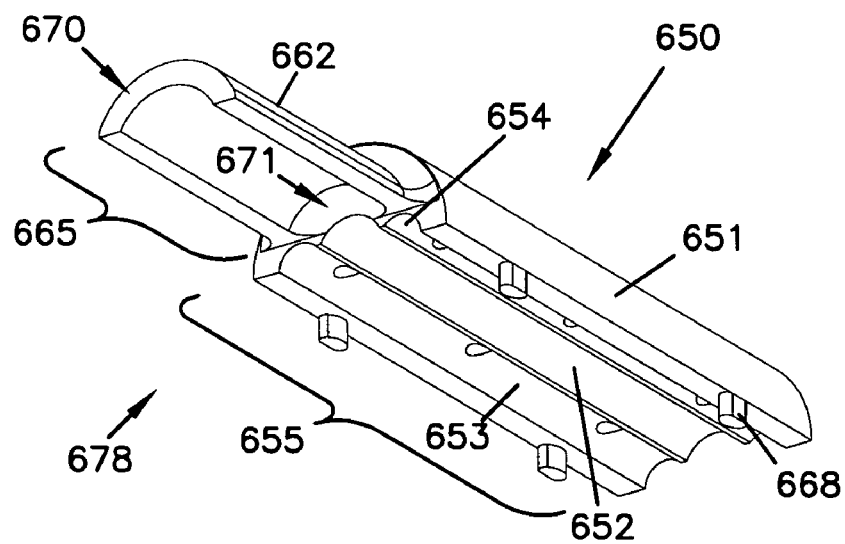
FIG. 62 is a bottom perspective view of the cover of FIG. 61.
Figure 63:
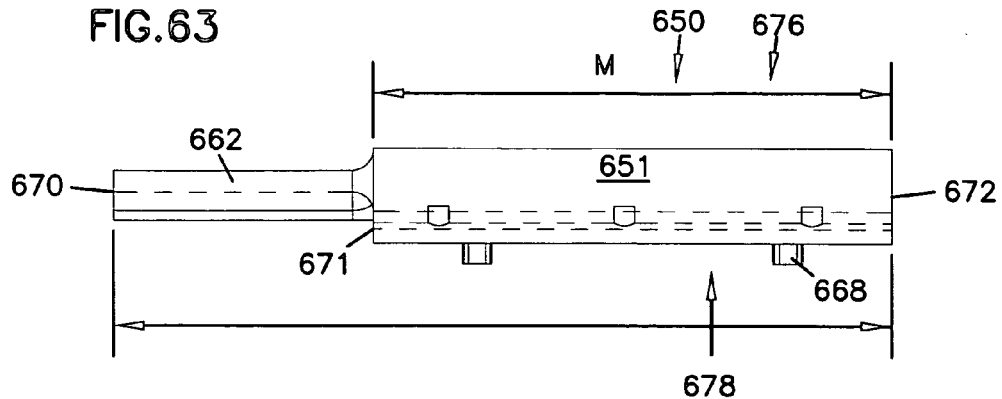
FIG. 63 is a side view of the cover of FIG. 61.
Figure 64:
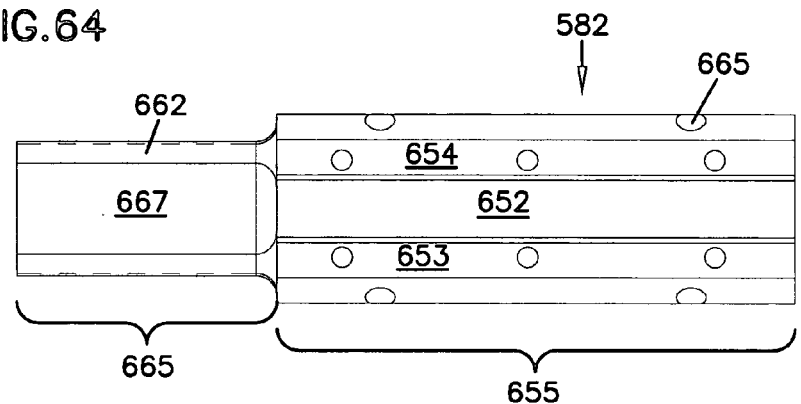
FIG. 64 is a top view of the cover of FIG. 61.
Figure 65:
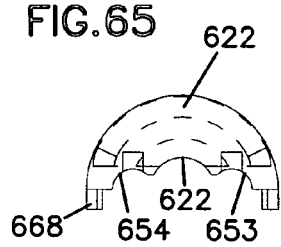
FIG. 65 is a transverse cross-sectional view of the cover of FIG. 61.
Figure 66:
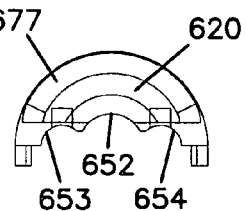
FIG. 66 is a front view of the cover of FIG. 61.

The cover 650 of the retention block 600 mounts over the second side 628 of the base 610. As shown at FIG. 64, the cover 650 includes a first section 655 and a second section 665. The cover 650 also includes a first side 676 (FIG. 61) and a grooved side 678 (FIG. 62). The first side 676 of the first section 655 includes a curved top surface 651 extending from the intermediate end 671 to the first end 672. A transition flange 662 having a generally U-shaped transverse cross-section extends outwardly from the intermediate end 671 to a second end 670. The grooved side 678 of the first section 655 of the cover 650 includes a central groove 652 and two side grooves 653, 654.

Figure 67:
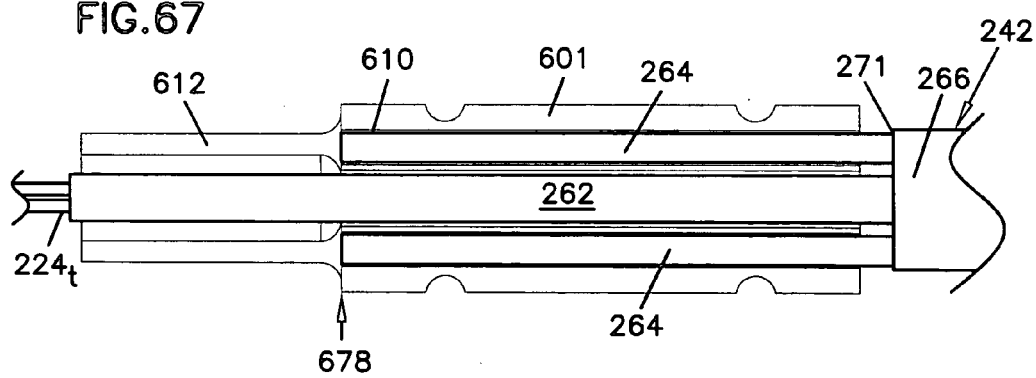
FIG. 67 is a top view of the cover of FIG. 61 showing preparation of a tether cable at an example mid-span breakout location.

In use, the cover 650 is mounted onto the base 610 to align the central groove 652 of the cover 650 with the central groove 602 of the base 610, and to align the side grooves 653, 654 of the cover 650 with the side grooves 603, 604 of the base 610. Thus, when the retention block 600 is assembled, the buffer tube 262 of the tether 242 is captured within the central grooves 602, 652, and the strength members 264 of the tether 242 are captured within the side grooves 603, 653, 604, 654 (FIG. 67). An adhesive can be applied between the cover 650 and the base 610 to securely affix the tether 242 to the retention block 600. In one embodiment, the adhesive is applied to the second side 628 of the base 610, the grooved side 678 of the cover 650, the buffer tube 262 of the tether 242, and the strength members 264 of the tether 242.

In some embodiments, the retention block 600 also includes structures for facilitating aligning the cover 650 on the base 610. For example, as shown at FIGS. 55 and 62, the retention block 600 can include mating posts 668 and surface depressions (e.g., grooves, slots, cuts, notches, indentations) 608 provided on the cover 650 and the base 610. The posts 668 fit within the notches 608 to maintain alignment between the base 610 and the cover 650 during assembly. For example, in the embodiment shown, mating posts 668 protrude downwardly from the cover 650 to engage with slots 608 on the side surfaces 601 of the base 610. In other embodiments, however, other suitable alignment members could also be used.

Referring now to FIG. 67, to prepare the tether 242 to be incorporated into the mid-span breakout assembly 240', a portion of the outer jacket 266 of the tether cable 242 is stripped away to expose the central buffer tube 262 and the strength members 264. As shown at FIG. 67, the central buffer tube 262 and the strength members 264 project outwardly beyond an end 271 of the outer jacket 266. The strength layer 265 has been displaced from around the buffer tube 262. After removing the end portion of the outer jacket 266, the strength members 264 are trimmed as shown at FIG. 67, and an end portion of the central buffer tube 262 is removed to expose the fibers $224_t$.

The tether 242 is then mounted to the base 610 of the retention block 600. For example, as shown at FIG. 67, the strength members 264 are positioned within the side grooves 603, 604 of the base 610, and the central buffer tube 262 is inserted within the central groove 602 of the base 610. The central buffer tube 262 has a length that extends beyond the intermediate end 621 of the base 610, and the strength members 264 have lengths that terminate generally at the intermediate end 621 of the base 610. In some embodiments, the central buffer tube 262 extends beyond the end 620 of the retention block 600. In other embodiments, however, the central buffer tube 262 terminates between the intermediate end 621 and end 620.

Figure 68:
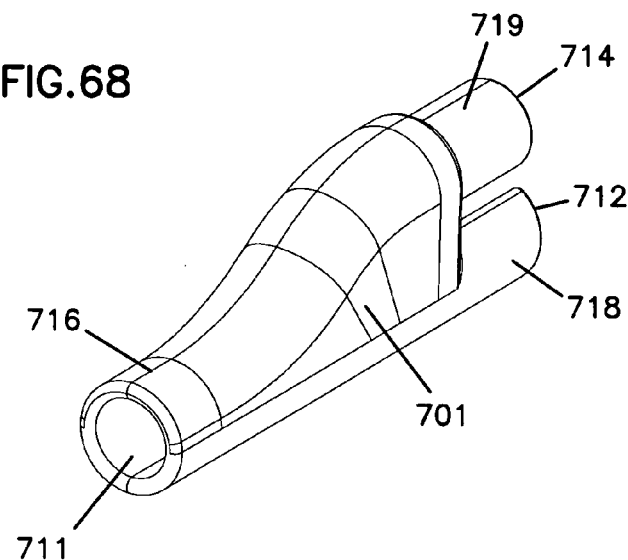
FIG. 68 is a front perspective view of an example separation block.
Figure 69:
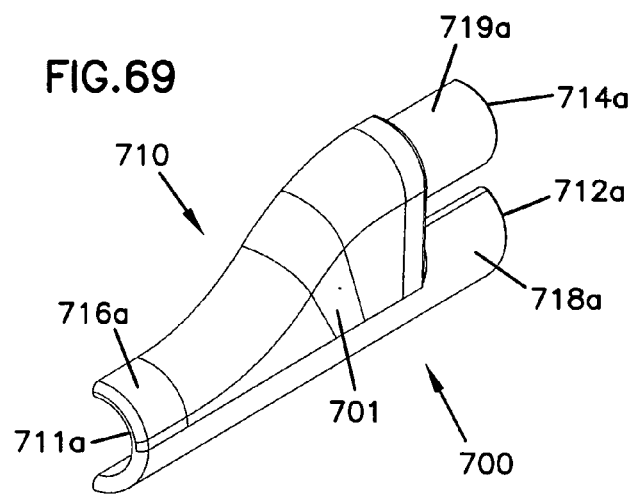
FIG. 69 is a front perspective view of an example first section of the separation block of FIG. 68.

Referring now to FIGS. 68–80, a separation block 700 provides support for transitioning fibers $224_{dc}$ from the distribution cable 220 to a fusion location. As shown in FIG. 68, the separation block 700 includes a Y-shaped housing 701 defining a first opening 711 on an upstream end of the separation block 700, a second opening 712 on a downstream end of the separation block, and a third opening 714 also located on the downstream end. A generally tubular section 716 of the housing 701 forms the first opening 711 and generally tubular sections 718, 719 of the housing 701 form the second and third openings 712, 714.

Figure 71:
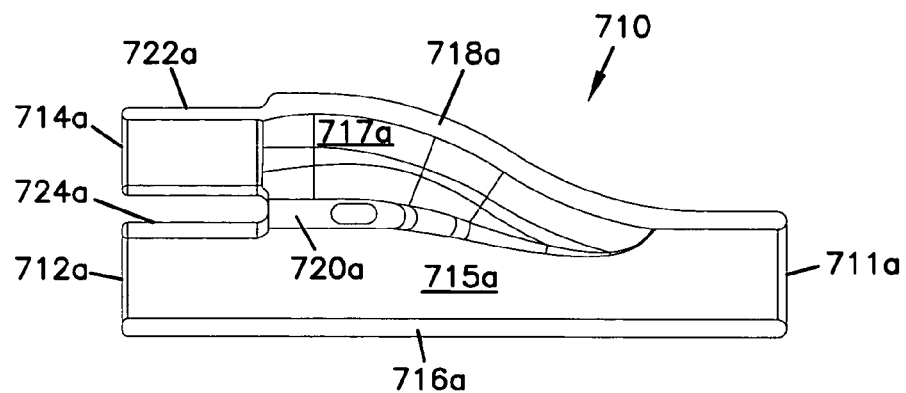
FIG. 71 is a side view of the first section of FIG. 69.
Figure 72:
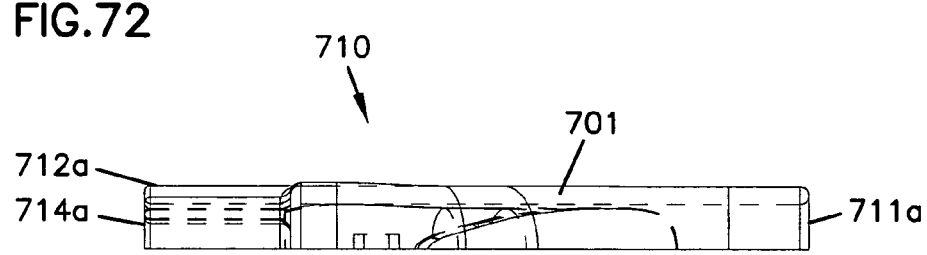
FIG. 72 is a top view of the first section of FIG. 69.
Figure 73:
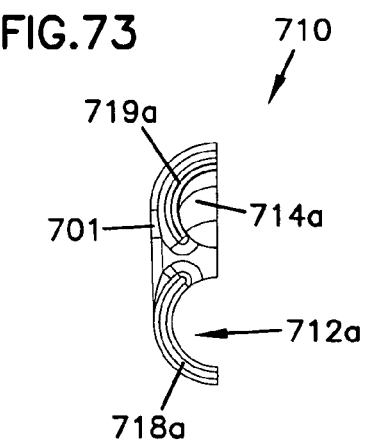
FIG. 73 is a rear view of the first section of FIG. 69.

The second opening 712 is generally aligned with the first opening 711 to form a first channel 715 (FIGS. 71 and 76). The third opening 714 leads to a second channel 717 (see FIGS. 71 and 76) that joins with the first channel 715 at the tubular section 716 of the housing 701. Tubular sections 716, 718 forming the first channel 715 are sized and shaped to enclose the buffer tubes 222 and central strength member 226 of the distribution cable 220. Tubular section 719 forming the second channel 717 is sized and shaped to fit within the tube 800 and to enclose the fibers $224_{dc}$ accessed from the distribution cable 220 for splicing with the fibers $224_t$ of the tether cable 242.

In some embodiments, the separation block 700 is formed from a first section 710 and a second section 750. In the example shown, the first and second sections 710, 750 each include grooves 715a, 715b that align and combine to form the channel 715. Similarly, aligning and combining grooves 717a, 717b forms the channel 717. A protruding section 720a defines the grooves 715a, 717a and a protruding section 720b defines the grooves 715b, 717b.

Figure 70:
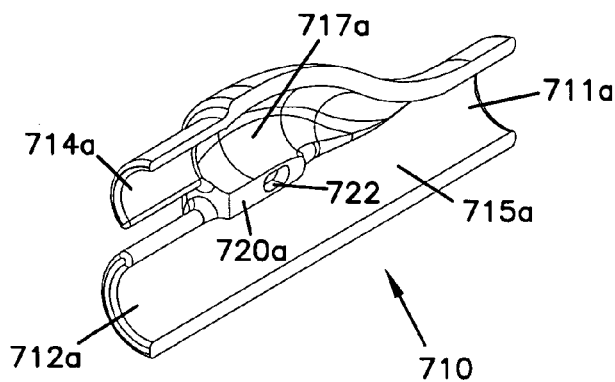
FIG. 70 is a rear perspective view of the first section of FIG. 69.

In some embodiments, the first and second sections 710, 750 are fastened together with complementary surface depressions 722 and protrusions 724 (FIGS. 70 and 75). In one example embodiment, the protruding section 720a on the first section 710 defines a hole 722 and the protruding section 720b on the second section 750 includes a protrusion 724 sized to fit within the hold 722. Adhesive can also be used to secure the first section 710 to the second section 750.

The mid-span breakout location on the distribution cable 220 can be prepared in a similar manner to the preparation discussed above with respect to FIG. 52. A portion of the outer jacket 230 of the distribution cable 220 is first stripped away to provide a stripped region 400' (FIG. 53). One of the buffer tubes 222 is selected and a first window 408' and a second window are cut into the selected buffer tube 222. The fibers $224_{dc}$ desired to be broken out are then accessed, severed, and pulled from the buffer tube 222 through the first window 408'. With the distribution cable 220 prepared as shown in FIG. 80, the severed fibers $224_{dc}$ are ready to be fused with the tether fibers $224_t$.

To connect the tether 242 to the fibers $224_{dc}$, the splice sleeve 246 and the tube 800 (FIG. 53) are first slid over the fibers $224_t$ of the tether 242, and the tube 800 is further slid up over the tether jacket 266. With the splice sleeve 246 and tube 800 mounted on the tether 242, the fibers $224_t$ of the tether are fused to the fibers $224_{dc}$ of the distribution cable 220. The fibers are then tested to confirm that the fibers meet minimum insertion loss requirements.

After the fusion process is complete, the splice sleeve 246 can be slid over the fusion location to protect the splice. In some embodiments, the splice sleeve 246 has a length of less than 40 mm. Preferably, the splice sleeve 246 has a length of less than 35 mm. In one example embodiment, the splice sleeve 246 has a length of about 30 mm. In another embodiment, the splice sleeve 246 has a length of less than 30 mm. Decreasing the length of the splice sleeve 246 increases the degree to which the mid-span breakout assembly can bend. Increasing the flexibility of the breakout assembly 240, 240' facilitates wrapping the distribution cable 220 having the breakout assembly 240, 240' around a spool.

After verifying the insertion loss, the tube 800 can be slid over the splice sleeve 246 and the fusion location to protect the spliced fibers $224_{dc}$, $224_t$. The separation block 700 can then be added to the upstream location 402' of the stripped portion 400' of the distribution cable 220. The buffer tubes 222 are routed through the first channel 715 of the separation block 700 and the severed fibers $224_{dc}$ are routed through the second channel 717 of the separation block 700 (FIG. 80). To route the fibers, in some embodiments, the buffer tubes 222 are laid within the first groove 715a of the first section 710 of the separation block 700 and the fibers $224_{dc}$ are laid within the second groove 717a of the first section 710 as shown in FIG. 79. The second section 750 of the separation block 700 can be secured to the first section as discussed above.

Typically, the separation block 700 does not enclose the outer strength member 228. In some embodiments, the outer strength member 228 can be redistributed uniformly about the buffer tubes 222 of the distribution cable 220 at the upstream and downstream ends 402', 404' after installing the separation block 700. In such embodiments, the outer strength member 228 extends across the breakout location 241'.

After installing the separation block 700, the tube 800 can be slid onto section 719 of the separation block 700. In some embodiments, the tube 800 can optionally be taped or otherwise temporarily secured to the separation block 700. In other embodiments, the tube 800 is permanently secured to the separation block 700 with adhesive. In still other embodiments, the tube 800 is not secured to the separation block 700.

The retention block 600 is then mounted to the tether cable 242. The retention block 600 is preferably positioned so that one end of the tube 800 is slid over the transition flanges 612, 662 of the retention block 600 and the other end of the tube 800 remains over section 719 of the separation block 700. In general, the tube 800 has an appropriate length to provide the fibers $224_{dc}$, $224_t$ with sufficient excess fiber length to allow bending of the mid-span access location 241'. The retention block 600 is then affixed to the distribution cable 220. In some embodiments, the groove 630 of the base 610 of the retention block is affixed (e.g., with adhesive) to the outer strength member 228 wrapped around the distribution cable 220.

To finalize the assembly process, the heat resistant tape/foil can be wrapped around the mid-span breakout location 241'. Thereafter, the process is completed by applying an over mold 260' over the mid-span breakout location 241'. The over mold layer 260' functions to seal and protect the underlying components of the mid-span breakout assembly 240'. Thereafter, the distribution cable 220 can be spooled. It is preferred for the fibers $224_t$ of the tether to be pre-terminated to the fibers $224_{dc}$ of the distribution cable. The remainder of the mid-span breakout assembly 240' is also preferably factory installed.

As used herein, with respect to buffer tubes, the term "fiber access location" can be any type of location where a fiber can be routed out of a buffer tube. Example fiber access locations include windows, ring cut regions, or other openings in a buffer tube. Additionally, when the fibers $224_{dc}$, $224_t$ have been spliced together, the fibers $224_{dc}$, $224_t$ can collectively be referred to as an optical fiber structure. In such a case, the optical fiber structure includes a first length of optical fiber within the distribution cable, a second length of optical fiber that extends through the breakout location and a third length of optical fiber that extends through the tether. The first, second and third lengths are in optical communication with one another so as to define a signal path that extends from the distribution cable, through the breakout location, to the end of the tether. The term optical fiber structure also includes lengths of optical fibers that do not include intermediate splices. As used herein, the term "breakout portions" of optical fiber include portions of optical fiber that extend along the length of a breakout location.

From the forgoing detailed description, it will be evident that modifications and variations can be made in the devices of the disclosure without departing from the spirit or scope of the invention.

What is claimed is:

1. A telecommunications cable comprising:
    a distribution cable including a distribution cable jacket and a plurality of buffer tubes positioned within the cable jacket, the plurality of buffer tubes including a first buffer tube, the distribution cable including a mid-span location where a portion of the distribution cable jacket has been removed and where at least the first buffer tube includes a fiber access location;
    a tether cable including a tether jacket, a tether buffer tube positioned within the jacket, and at least one strength member;
    a retention block configured to install on the distribution cable at a downstream end of the mid-span location, the retention block configured to retain the tether buffer tube and the at least one strength member of the tether cable;
    a separation block configured to install on the distribution cable at an upstream end of the mid-span location, the separation block including a first channel extending from a first end of the separation block to an opposite second end of the separation block, the plurality of buffer tubes of the distribution cable passing through the first channel, the separation block also including a second channel extending from the first channel to the second end of the separation block;
    a tube that extends along the mid-span location from the separation block to the retention block;
    a length of optical fiber optically coupled to the distribution cable at one end and optically coupled to the tether cable at an opposing end, the length of optical fiber passing through the second channel of the separation block, along the tube, and through the retention block; and
    an overmold that covers the retention block, the separation block, and the tube.

2. The telecommunications cable of claim 1, wherein the separation block is generally Y-shaped.

3. The telecommunications cable of claim 1, wherein the separation block includes a first section and a second, opposing section.

4. The telecommunications cable of claim 3, wherein a mechanical interlock exists between the first section and the second opposing section.

5. The telecommunications cable of claim 4, wherein the mechanical interlock includes a depression defined in the first section and a protruding portion on the second opposite section.

6. The telecommunications cable of claim 1, wherein the separation block includes a first section including a first groove and a second groove, and a second section including a first groove and a second groove, and wherein the first groove of the first section aligns with the first groove of the second section to form the first channel of the separation block, and the second groove of the first section aligns with the second groove of the second section to form the second channel of the separation block.

7. The telecommunications cable of claim 1, wherein the telecommunications cable is sized to be pulled through a conduit having a 1.25 inch inner diameter.

8. The telecommunications cable of claim 1, wherein the tether is a stub cable or a drop cable.

9. The telecommunications cable of claim 1, further comprising a splice sleeve that surrounds a portion of the length of optical fiber, the splice sleeve configured to fit within the tube.

10. The telecommunications cable of claim 9, wherein the splice sleeve has a length of less than or equal to 30 mm.

11. The telecommunications cable of claim 9, wherein the splice sleeve has a length of less than about 35 mm.

12. The telecommunications cable of claim 1, wherein the separation block includes a first section, a second section, and a third section, each section having a substantially tubular shape, the first and second section forming opposing ends of the first channel, the third section forming an end of the second channel.

13. The telecommunications cable of claim 12, wherein the third section of the separation block is configured to fit within the tube.

14. The telecommunications cable of claim 1, wherein the retention block is mounted onto an outer strength member of the distribution cable.

15. The telecommunications cable of claim 1, wherein the length of optical fiber has an excess fiber length in the range of 2–5 percent.

16. A telecommunications cable comprising:
a distribution cable including a cable jacket, a plurality of buffer tubes positioned within the cable jacket, and an outer strength member positioned about the plurality of buffer tubes, the plurality of buffer tubes including a first buffer tube, the distribution cable including a mid-span location where a portion of the cable jacket has been removed, where the outer strength member extends across the mid-span location, and where at least the first buffer tube includes a fiber access location;
a tether that branches from the distribution cable at the mid-span location, the tether including a tether jacket, a tether buffer tube positioned within the jacket, and at least one strength member also positioned within the jacket;
a separation block configured to install on the distribution cable, the separation block including a first channel extending from a first end of the separation block to an opposite second end of the separation block, where the first channel is configured to retain the plurality of buffer tubes of the distribution cable and not the outer strength member, the separation block also including a second channel extending from the first channel to the second end of the separation block;
a first optical fiber that extends through the first buffer tube of the distribution cable, the first buffer tube being routed through the first channel of the separation block, the first optical fiber being routed out of the first buffer tube through the fiber access location and through the second channel of the separation block;
a second optical fiber that extends through the tether buffer tube; and
the first optical fiber being spliced to the second optical fiber at a splice location to form a spliced length of fiber, the splice location located adjacent the mid-span location.

17. The telecommunications cable of claim 16, further comprising an overmold that covers the retention block, the separation block, and the tube.

18. The telecommunications cable of claim 16, wherein the telecommunications cable is sized to be pulled through a conduit having a 1.25 inch inner diameter.

19. The telecommunications cable of claim 16, wherein the spliced length of fiber has an excess fiber length in the range of 2–5 percent.

20. A telecommunications cable comprising:
a distribution cable including a plurality of buffer tubes exposed at a mid-span location;
a tether that branches from the distribution cable at the mid-span location, the tether including a tether buffer tube and at least one strength member;
a separation block configured to install on the distribution cable at an upstream end of the mid-span location, the separation block including a first channel and a second channel, the first channel configured to retain the plurality of buffer tubes at the mid-span location;
a retention block configured to install on the distribution cable at a downstream end of the mid-span location, the retention block configured to retain the tether buffer tube and the at least one strength member of the tether;
a first optical fiber that extends through one of the plurality of buffer tubes of the distribution cable, the first optical fiber extending out of the buffer tube through the second channel of the separation block to a splice location;
a second optical fiber that extends through the tether buffer tube and through the retention block to the splice location, the first optical fiber being spliced to the second optical fiber at a splice location to form a spliced length of fiber;
a splice sleeve configured to enclose the spliced length of fiber at the splice location, the splice sleeve having a length extending less than 35 mm; and
a tube extending from the separation block to the retention block, the tube enclosing the splice sleeve.

21. The telecommunications cable of claim 20, wherein the splice sleeve is less than or equal to 30 mm.

22. The telecommunications cable of claim 20, wherein the spliced length of fiber has an excess fiber length in the range of 2–5 percent.

* * * * *